US012574303B2

(12) United States Patent

Ickin et al.

(10) Patent No.: US 12,574,303 B2

(45) Date of Patent: Mar. 10, 2026

(54) CONDITIONAL GENERATIVE MODEL RECOMMENDATION FOR RADIO NETWORK

(71) Applicant: Telefonaktiebolaget LM Ericsson (publ), Stockholm (SE)

(72) Inventors: Selim Ickin, Stocksund (SE); Oleg Gorbatov, Luleå (SE); Konstantinos Vandikas, Solna (SE); Lackis Eleftheriadis, Valbo (SE); Cecilia Nyström, Stockholm (SE); Helene Hallberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 503 days.

(21) Appl. No.: 18/029,237

(22) PCT Filed: Oct. 5, 2021

(86) PCT No.: PCT/EP2021/077471

§ 371 (c)(1),
(2) Date: Mar. 29, 2023

(87) PCT Pub. No.: WO2022/074015

PCT Pub. Date: Apr. 14, 2022

(65) Prior Publication Data

US 2023/0370341 A1 Nov. 16, 2023

Related U.S. Application Data

(60) Provisional application No. 63/087,965, filed on Oct. 6, 2020.

(51) Int. Cl.
*H04L 41/5009* (2022.01)
*H04L 41/16* (2022.01)

(52) U.S. Cl.
CPC .......... *H04L 41/5009* (2013.01); *H04L 41/16* (2013.01)

(58) Field of Classification Search
None
See application file for complete search history.

(56) References Cited

U.S. PATENT DOCUMENTS

2019/0068443 A1    2/2019  Li et al.
2020/0084601 A1*   3/2020  Garrity .................. H04W 4/35
(Continued)

FOREIGN PATENT DOCUMENTS

CN         111148118 A      5/2020
WO    WO-2022028687 A1 *   2/2022  ............... G06N 7/01

OTHER PUBLICATIONS

International Search Report and Written Opinion of the International Searching Authority, PCT/EP2021/077471, mailed Jan. 27, 2022, 17 pages.

(Continued)

*Primary Examiner* — Angela Nguyen

(74) *Attorney, Agent, or Firm* — Sage Patent Group

(57) ABSTRACT

A method performed by a computing device for a radio network for configuration of a network device on which network or data energy can be collected while preserving specified conditions in the radio network is provided. The method includes receiving inputs to a conditional generative model. The inputs include the specified conditions in the radio network including a value for a predicted key performance indicator, KPI, constraint parameter for a time period, a target value for a optimization parameter, and a latent variable. The method further includes outputting from the conditional generative model a configuration data for a future time period for the network node or the cell of the radio network. The configuration data is bounded by the specified conditions including the predicted KPI constraint (Continued)

parameter, the target value for the optimization parameter, and the latent variable.

20 Claims, 15 Drawing Sheets

(56)                    References Cited

U.S. PATENT DOCUMENTS

2020/0267174 A1      8/2020   Soulhi et al.
2024/0405915 A1*    12/2024   Zhou ..................... H03M 13/09

OTHER PUBLICATIONS

Li, Zeyan et al., "Robust and Unsupervised KPI Anomoly Detection Based on Conditional Variational Autoencoder," 2018 IEEE 37th International Performance Computing and Communications Conference (IPCCC), Nov. 17, 2018, 9 pages.
ETSI GR NGP 006 v1.1.1 (Jun. 2018); European Telecommunications Standards Institute; Group Report; Next Generation Protocols (NGP); Intelligence-Defined Network (IDN); 35 pages.
Doersch, Carl, "Tutorial on Variational Autoencoders," arXiv. 1606. 05908v3, Jan. 3, 2021, 23 pages.
Keeney, John et al, "ONAP: A1 Adapter in OSC and ONAP," Open Network Automation Platform; Jun. 24, 2020; accessed on the Internet in Mar. 21, 2023 at: https://wiki.onap.org/pages/viewpage. action? pageId=84644984&preview=/84644984/84655111/20200624% 20LFN%20DTF%20ONAP-A1%20JohnKeeney.pdf; 26 pages.

* cited by examiner

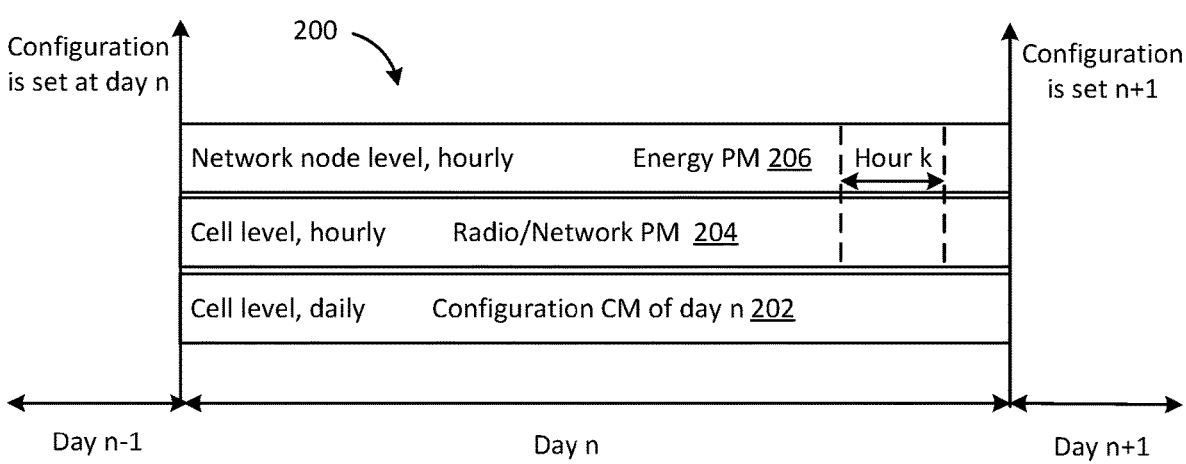

Configuration is set at day n

200

Configuration is set n+1

| | | |
|---|---|---|
| Network node level, hourly | Energy PM 206 | Hour k |
| Cell level, hourly | Radio/Network PM 204 | |
| Cell level, daily | Configuration CM of day n 202 | |

Day n-1          Day n          Day n+1

Figure 2

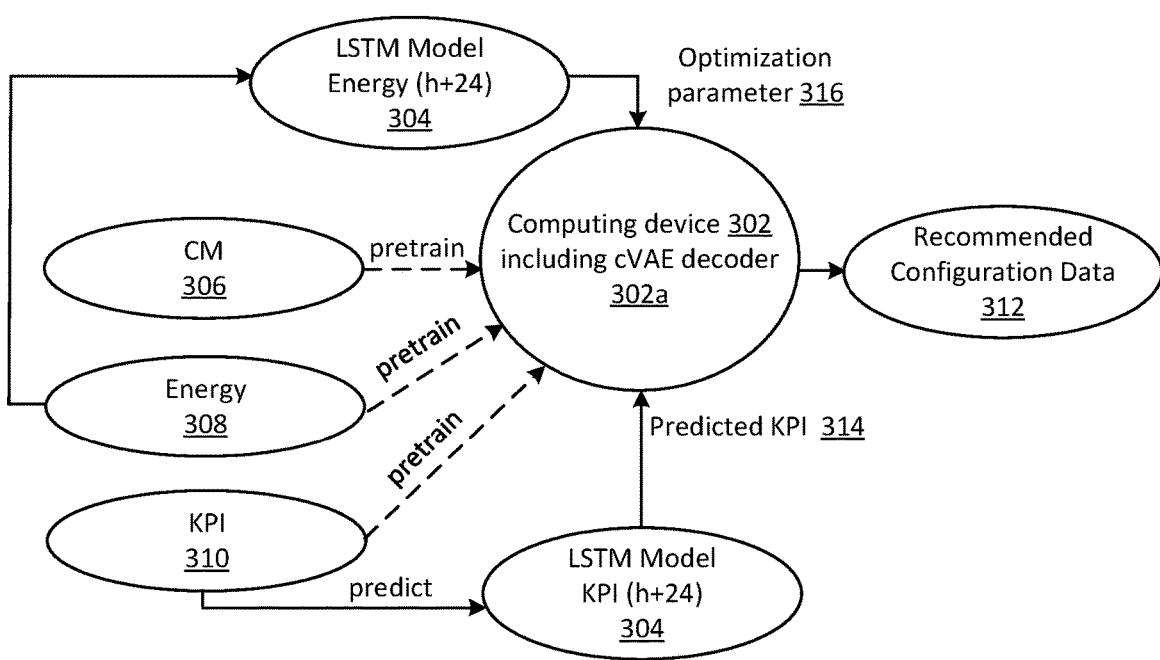

LSTM Model Energy (h+24) 304

Optimization parameter 316

CM 306 pretrain

Computing device 302 including cVAE decoder 302a

Recommended Configuration Data 312

Energy 308 pretrain

KPI 310 pretrain

Predicted KPI 314 predict

LSTM Model KPI (h+24) 304

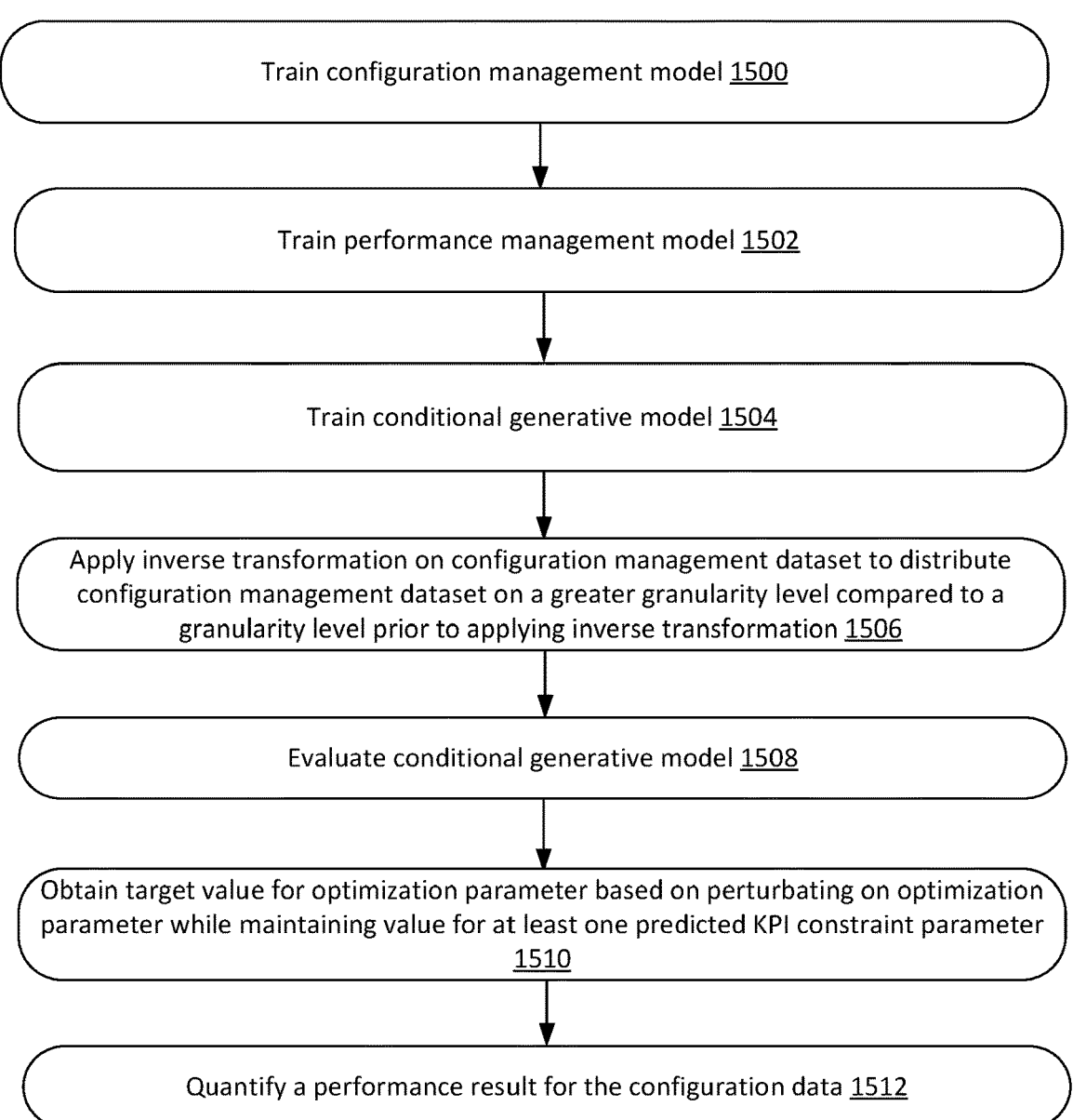

Receive inputs to conditional generative model including a value for a predicted key performance indicator, KPI, constraint parameter for a time period, a target value for an optimization parameter, and a latent variable 1400

Output from the conditional generative model a configuration data for a future time period for a network node of radio network, wherein the configuration data is bounded by the predicted KPI constraint parameter, the target value for the optimization parameter, and the latent variable 1402

Figure 14

Train configuration management model 1500

Train performance management model 1502

Train conditional generative model 1504

Apply inverse transformation on configuration management dataset to distribute configuration management dataset on a greater granularity level compared to a granularity level prior to applying inverse transformation 1506

Evaluate conditional generative model 1508

Obtain target value for optimization parameter based on perturbating on optimization parameter while maintaining value for at least one predicted KPI constraint parameter 1510

Quantify a performance result for the configuration data 1512

CONDITIONAL GENERATIVE MODEL RECOMMENDATION FOR RADIO NETWORK

CROSS REFERENCE TO RELATED APPLICATIONS

This application is a 35 U.S.C. § 371 national stage application of PCT International Application No. PCT/EP2021/077471 filed on Oct. 5, 2021, which in turn claims domestic priority to U.S. Provisional Patent Application No. 63/087,965, filed on Oct. 6, 2020, the disclosures and content of which are incorporated by reference herein in their entirety.

TECHNICAL FIELD

The present disclosure relates generally to a method for a recommendation(s) from a conditional generative model for a radio network, and related methods and apparatuses.

BACKGROUND

Some approaches for recommendations for a radio network include the following.

Content based filtering can be based on recommending good example neighboring network devices on which network or energy data can be collected, where neighboring can be defined by a similarity distance metric among the content such as Euclidean, cosine, dot product, Automatic Neighbor Relations (ANR), etc. Content based filtering can be based on a neighboring device(s) that may be performing better or worse as compared to each other, and the underlying configuration of the device(s) that are performing better can be recommended to those that are performing worse. For example, energy saving configuration change recommendation data can be recommended. FIG. 1 is a schematic diagram illustrating a content based filtering recommendation of energy saving recommendation configuration data. A compressed representation (via Principal Component Analysis, PCA) of items 100$a$ are obtained followed by the computation of nearest nodes 100$b$-100$f$ depending on a distance metric of performance management counters that measure network and radio quality metrics at every node 100$b$-100$f$. In the example of FIG. 1, there are five neighboring nodes 100$b$-100$f$ identified for node 100$a$. Next, given that each node 100$b$-100$f$ yields different outcome Energy, E, 104$b$-104$f$, there should be some node configuration action 102$b$-102$f$ that can be recommended to those nodes 100$b$-100$f$ having poor E 104$b$-104$f$ from those nodes 100$b$-100$f$ having better E 104$b$-104$f$.

Collaborative filtering can be based on user-item historical interaction. Given that independent entities can have a subset of common device configuration in the past, the subset can be considered as potentially and approximately similar. Hence, a remaining subset of configurations on similar devices that are uncommon and having a lower energy consumption can be suggested to those that are yielding a higher energy consumption.

Graph Neural Networks (GNN) based approaches rely on modelling a relationship between users/items (e.g., nodes and configurations) by way of a graph (or adjacency matrix) and thereafter can train a GNN that operates on an input graph in order to make recommendations. Consequently, GNNs can produce recommendations based on known interactions and the corresponding similarity of the participating entities.

Reinforcement Learning (RL) can include different variants of training algorithms, such as multi-arm bandit, contextual bandit, and deep RL with states. Deep RL can be very suitable in cases where a state changes with some corresponding sequence of actions. In a case where a state is not changing (such as the lack of frequent configuration changes at a base station), contextual bandit can be used such that a goal is to find out the best action given any state. This way, cross-device actions can be performed at any device state. Contextual bandit includes a reward function where a trained agent eventually learns to choose the best action (e.g., optimal policy) that can yield minimized energy consumption given the state. For example, a state can be performance management (PM) attributes (e.g., radio network counters) and the action can be configuration management (CM) attributes in a dataset.

SUMMARY

Existing approaches for configuration of a network device in a radio network may optimize only one or a small subset of actions at a time, which also eventually may yield sub-optimal conclusions. Additionally, it may not be possible to recommended one action while keeping other possible actions untouched due to complex interdependency in between the attributes and the actions. Data compression also may be needed and, thus, loss of granularity in a dataset may occur.

In some embodiments of the present disclosure, a method is provided that can increase a subset of configuration attributes by changing corresponding dependent attributes (e.g., by a latent walk at the corresponding subspace of a compressed representation). As a consequence, a recommendation may cover all possible recommendation options at once; and data compression may not be needed.

Certain aspects of the disclosure and their embodiments may provide solutions to these and other challenges.

In some embodiments, a method performed by a computing device for a radio network for configuration of a network device on which network or data energy can be collected while preserving specified conditions in the radio network is provided. The method includes receiving inputs to a conditional generative model. The inputs comprising the specified conditions in the radio network comprising a value for a predicted key performance indicator, KPI, constraint parameter for a time period, a target value for a optimization parameter, and a latent variable. The method further includes outputting from the conditional generative model a configuration data for a future time period for the network device of the radio network. The configuration data is bounded by the specified conditions comprising the predicted KPI constraint parameter, the target value for the optimization parameter, and the latent variable.

In other embodiments, a computing device including a conditional generative model for configuration of a network device on which network or data energy can be collected while preserving specified conditions in a radio network is provided. The computing device includes at least one processor; and at least one memory connected to the at least one processor and storing program code that is executed by the at least one processor to perform operations. The operations includes receive inputs to a conditional generative model. The inputs comprises the specified conditions in the radio network comprising a value for a predicted KPI constraint parameter for a time period, a target value for a optimization parameter, and a latent variable. The operations further include output from the conditional generative model a configuration data for a future time period for the network device of the radio network. The configuration data is bounded by the specified conditions comprising the predicted KPI constraint parameter, the target value for the optimization parameter, and the latent variable.

In other embodiments, a computing device including a conditional generative model for configuration of a network device on which network or data energy can be collected while preserving specified conditions in a radio network is provided. The computing device is adapted to perform operations. The operations include receiving inputs to a conditional generative model. The inputs comprises the specified conditions in the radio network including a value for a predicted KPI constraint parameter for a time period, a target value for a optimization parameter, and a latent variable. The operations further include outputting from the conditional generative model a configuration data for a future time period for the network device of the radio network. The configuration data is bounded by the specified conditions comprising the predicted KPI constraint parameter, the target value for the optimization parameter, and the latent variable.

In other embodiments, a computer program including program code to be executed by processing circuitry of a computing device including a conditional generative model for configuration of a network device on which network or data energy can be collected while preserving specified conditions in a radio network is provided. Execution of the program code causes the computing device to perform operations. The operations includes receive inputs to a conditional generative model. The inputs comprises the specified conditions in the radio network comprising a value for a predicted KPI constraint parameter for a time period, a target value for a optimization parameter, and a latent variable. The operations further include output from the conditional generative model a configuration data for a future time period for the network device of the radio network. The configuration data is bounded by the specified conditions comprising the predicted KPI constraint parameter, the target value for the optimization parameter, and the latent variable.

In other embodiments, a computer program product including a non-transitory storage medium including program code to be executed by processing circuitry of a computing device including a conditional generative model for configuration of a network device on which network or data energy can be collected while preserving specified conditions in a radio network is provided. Execution of the program code causes the computing device to perform operations. The operations include receive inputs to a conditional generative model. The inputs comprises the specified conditions in the radio network comprising a value for a predicted KPI constraint parameter for a time period, a target value for a optimization parameter, and a latent variable. The operations further includes outputting from the conditional generative model a configuration data for a future time period for the network device of the radio network, wherein the configuration data is bounded by the specified conditions comprising the predicted KPI constraint parameter, the target value for the optimization parameter, and the latent variable.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 2 is a schematic diagram illustrating an overview of PM and CM measurements in accordance with some embodiments of the present disclosure;

FIG. 3 is a block diagram illustrating an exemplary embodiment of components in accordance with some embodiments of the present disclosure;

FIG. 7 is a plot of an exemplary embodiment of latent space of input features including low and high energy/KPI in accordance with some embodiments of the present disclosure;

FIGS. 14-15 are flow charts of operations according to various embodiments of the present disclosure;

DETAILED DESCRIPTION

Figure 1:
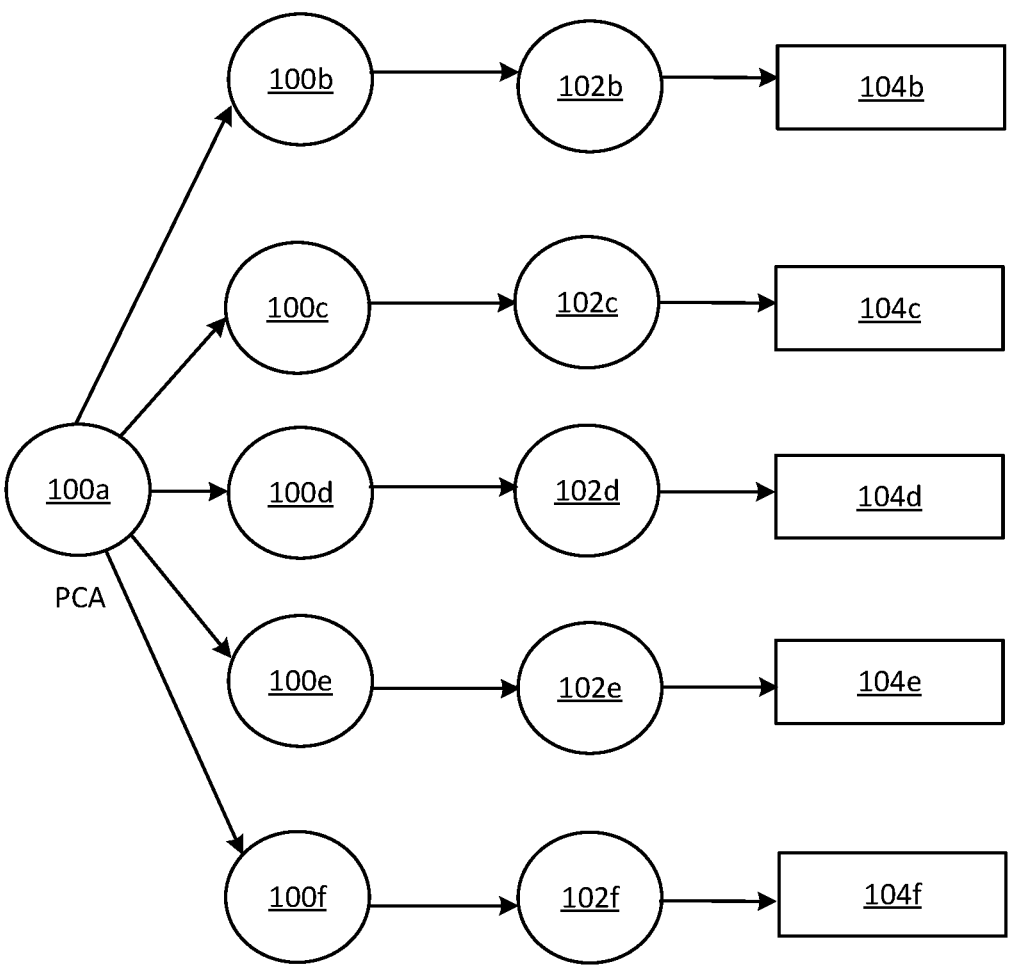
FIG. 1 is a schematic diagram illustrating a content based filtering recommendation of energy saving recommendation configuration data.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "network device" is used in a non-limiting manner and, as explained below, refers without limitation to any type of device in a radio network on which data can be collected (e.g., network and energy data) including, without limitation, a network device for receiving recommendation(s) in accordance with various embodiments of the present disclosure, such as a base station or a cell site.

Some approaches use generative models as a recommendation engine. For example, in some approaches, generative model based recommendation models (e.g., cascading denoising autoencoder (CDAE), variational encoder for collaborative filtering (MultVAE), recommender variational autoencoder (RecVAE), conditional generative adversarial network (cGAN)) may be applied to improve collaborative filtering, where the recommendation is an item given a user, e.g., estimating/predicting user-item interaction.

In contrast to some approaches, various embodiments of the present disclosure include a recommendation of a full configuration file instead of a set of single configuration changes given network states. Further, input to generative models of some approaches may be an item-user interaction. Creating an item-user interaction for a recommendation in a radio network can be difficult and non-trivial since there is no clear definition or interaction between base stations which makes interaction based methods unsuitable.

The following explanation of potential problems with some approaches is a present realization as part of the present disclosure and is not to be construed as previously known by others.

For content based filtering, manual work may be necessary, and neighboring nodes may be limited to only a similarity metric regardless of knowledge on the task at hand.

For collaborative filtering, nodes having a similar configuration may have very different PM values for the same configuration, which can make item-user matching non-trivial. In addition, due to matrix factorization involved in the process and a large size of the item-user matching matrix (eventually very high number of parameters and high memory footprint), the computation may not be feasible.

For GNNs, the capability of a GNN may be bounded by the amount of information which is available in a user/item interaction matrix. Historically, this dataset may grow enough to produce a satisfactory train/test space, but recommendations that are produced may still be bounded by those known recommendations. New and potentially more valuable recommendations will be out of reach until they occur. Techniques such as interpolation (or extrapolation) can be used to enhance such a matrix, but they would still be limited and may fail to capture all interactions.

For RL, it can be hard to design a good reward function to train a RL model since the reward function can include, e.g., multiple different key performance indicators (KPIs) together with the energy consumption. In addition, compressing of the dataset can be necessary as an additional operation due to high dimensionality of the input feature space, e.g., clustering, however then the RL model may lose granularity.

Approaches discussed above may optimize only one or a small subset of actions at a time without a recommendation engine approach, which also eventually may yield suboptimal conclusions. It often is not possible to recommended one action while keeping the other possible actions untouched due to complex interdependency in between the attributes and the actions.

Further, in the approaches discussed above, data compression is necessary and, thus, loss of granularity in a dataset may occur.

Various embodiments of the present disclosure may provide solutions to these and other potential problems. In some embodiments of the present disclosure, a method is provided that can increase a subset of configuration attributes by changing corresponding dependent attributes (e.g., by a latent walk at the corresponding subspace of a compressed representation). As a consequence, a recommendation may cover all possible recommendation options at once.

Additionally, trust is an important research challenge in recommendation systems. Various embodiments of the present disclosure include a conditional generative model including, with limitation a conditional variational auto encoder (cVAE) model. Use of a conditional generative model may ensure that important golden parameters are not negatively impacted during the recommendation. Golden parameters include, without limitation, important parameters for a customer (e.g., a feature that is part of a Service Level Agreement (SLA)). As a consequence, the method of various embodiments may quantify how much a parameter(s) (e.g., a golden parameter) deviates from a demanded value(s)). Additionally, a standard deviation parameter in a conditional generative model can be adjusted to adjust between a conservative versus a more creative generated recommendation.

Moreover, various embodiments of the present disclosure, may address an explainability perspective, up to some extent, since the latent representation is conditioned on the target and conditional variables, hence making those similarities neighbors to each other. As a consequence, non-obvious similarities in between configurations may be revealed.

Various embodiments of the present disclosure include a conditional generative model based recommendation engine such that the trained conditional generative model can generate recommendations given desired conditions. During training of the conditional generative model, the training can be conditioned on a set of desired attributes, such as maximum energy saving that can be tolerated at a predicted KPI value. Thus, after a training process, a decoder of the conditional generative model can take the demanded conditions, such as energy and predicted KPI together with a latent variable, and generate a corresponding recommendation bounded by the desired conditions. A potential advantage provided by various embodiments of the present disclosure may include that, due to the nature of VAE, a trained conditional generative model may generate a full configuration file conditioned on the given criteria, e.g., a KPI level, low energy consumption, golden parameters in SLA etc.

The method of various embodiments may enable a what-if type of study such that by small perturbation on the input conditions, e.g., low or high energy, low or high KPI, different possible configuration recommendations can be obtained. For example, many different categories of KPIs can be used in SLAs. The KPIs can be used as constraints to applicable energy use cases such that the KPIs are kept intact while sustaining SLAs. These KPIs can be used as input to a decoder of the conditional generative model when generating configuration files.

While some embodiments discussed herein are explained in the non-limiting context of using a cVAE model to optimize or improve energy consumption, the invention is not so limited. Instead, the method is non-specific and any conditional generative model can be used to optimize or improve other parameters in a radio network. Thus, a potential advantage provided by various embodiments of the present disclosure may include application of the method to optimize or improve parameters other than energy. For example, various KPIs can make the method applicable to multiple use cases. Examples of other use case include, without limitation, radio resource control (RRC) connection setup success rate, call setup success ratio per data, cell throughput in uplink and downlink, cell utilization, traffic data volume in uplink and downlink, intra and/or inter frequency handover success rate, etc. The KPIs can further be customized and selected as constraints based on customer specific needs.

The constraints can further be enriched with customized constraints depending on a SLA. In some cases, there can be configurations that may be applicable for a long term, while some may be applicable for solving short-term problems. Depending on the urgency of an appropriate solution, the constraints can be set in some cases as two hours, while in other cases the constraints can be set as 48 hours, etc. Thus, a potential advantage provided by various embodiments of the present disclosure may include that the realistic configuration files are generated accordingly. For example, in cases when applying a particular configuration takes longer than a SLA limit(s).

In some embodiments, PM and CM datasets are sampled at different time resolutions. FIG. 2 is a schematic diagram illustrating an overview of PM 204, 206 and CM 202 measurements 200 in accordance with some embodiments of the present disclosure. In the exemplary embodiment of FIG. 2, PM datasets 204, 206 are sampled hourly (which can eventually be generalized to higher granularity (e.g., 15 mins) in the case of data availability), while CM dataset 202 is a first snapshot of a configuration file of the corresponding day. The configuration file for the next day can be highly dependent on the predicted value of the KPI and the energy consumption such that with a good configuration file set early in the day, a minimized energy consumption can be achieved while sustaining (e.g., not surpassing a lower or upper bound threshold value) the predicted (e.g., ideally close to actual levels) KPI levels. It is noted that negative impact on predicted KPI levels is not desired. While some embodiments discussed herein are explained in the non-limiting context of training models hourly, the invention is not so limited. Instead, other aggregations can be considered and used but should be exercised in the same way across all trained models.

FIG. 3 is a block diagram illustrating an exemplary embodiment of components in accordance with some embodiments of the present disclosure. Referring to FIG. 3, components of the method of various embodiments can include: (1) a computing device 302 that includes a trained conditional generative model (e.g., a cVAE decoder 302a)) conditioned on a target value for an optimization parameter 316 (e.g., a value lower or higher than predicted energy consumption, a value lower or higher than an optimization parameter, a value lower or higher than an optimization parameter, a specific target value for the optimization parameter, etc.) and a predicted KPI constraint parameter 314 (e.g., from a prediction model 304 (e.g., a long short term memory (LSTM) prediction model predicting, e.g., 24 hours in advance); and (2) prediction model 304 that is pretrained with a multivariate timeseries form including hourly PM counters aggregated at a node level 308 (e.g., PM dataset 204/206).

Additional potential advantages provided by various embodiments of the present disclosure may include that there is no need for a pre-designed reward function (e.g., as in the case of RL) since the conditional generative model may learn to generalize the underlying input dataset representation at given conditions. Moreover, the conditional generative model may be fed as many criteria features as possible; and generation of data may be bounded by a set of given conditions which may make the recommendations realistic and depending on the realistic state. Further, there may be low computation complexity as compared to, e.g., Generative Adversarial Networks (GAN) based recommendation approaches due to lower parametrization, and hence there may be faster training and less energy consumption expected during training.

Further potential advantages may include that, due to the nature of a conditional generative model, the conditional generative model may inherit robustness characteristics due to the existence of upper and lower boundaries (around mean) of the estimated values as the loss function depends both on the reconstruction loss and the KL (Kullback-Leibler) divergence between a normal distribution. The conditional generative model also may inherit high generalization capabilities of generative models on unseen datasets. Additionally, the conditional generative model may be good at finding out similarities between configurations due to a KL divergence being involved in a loss function, which may enable similar configurations being located as closest neighbors (as clumped) in latent space. As a consequence, by using a trained encoder model of a conditional generative model, similarity of CM configuration files may be quantified by their distance in the latent space. Indirectly, this may provide new insights and thus help explainability of the conditional generative model.

Additional potential advantages may include that conditions may be further enhanced with user/expert feedback and the conditional generative model may be retrained with those update conditions. This way, domain expertise may be given as input to the trained conditional generative model. Further, the method is not limited by a set of user/item interactions and, therefore, may be useful in cases where such prior history is not available. Additionally, the method may be portable and reusable in the existence of many different prediction models, where a decoder of the conditional generative model may be fed by any predicted output of an arbitrary prediction model developed for any use case. While some embodiments discussed herein are explained in the non-limiting context of Random Forest and LSTM prediction models, the invention is not so limited and other ML techniques can apply.

Figure 4:
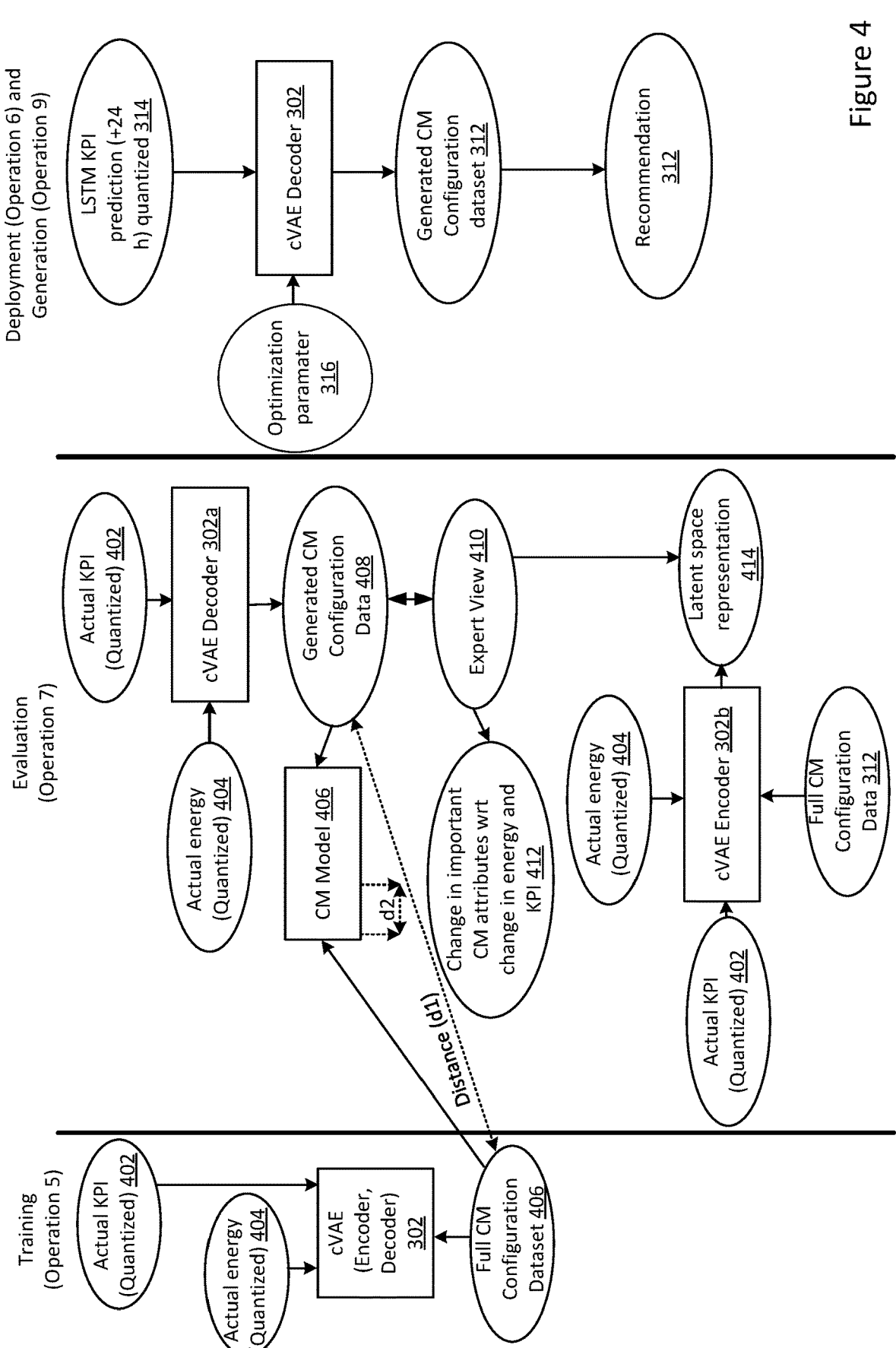
FIG. 4 is a block diagram illustrating an exemplary embodiment of training, evaluation, and deployment operations in accordance with some embodiments of the present disclosure.

FIG. 4 is a block diagram illustrating an exemplary embodiment of training, evaluation, and deployment operations in accordance with some embodiments of the present disclosure.

A summary of operations of the method of various embodiments of the present disclosure will now be discussed with reference to various Figures for some operations. Various of the operations discussed below may be optional with respect to some embodiments. For example, operations 1-5 and 7-11 may be optional. Operations 1-4, 8, and 10-11 are not shown in FIG. 4. Operations 1-4, 8, and 10-11 are described below, however, with reference to certain components illustrated in FIG. 4, and also with reference to components and operations illustrated in FIGS. 3 and 7.

Operation 1: A CM model 406 (e.g., Random Forest, Neural Network, etc.) is trained. The training includes, where given CM attributes 312 as inputs to CM model 406, CM model 406 can estimate a corresponding energy consumption per hour.

Operation 2: A CM model 406 (e.g., Random Forest, Neural Network, etc.) is further trained. The training includes, where given CM attributes 312 as inputs to CM model 406, CM model 406 estimates a corresponding KPI per hour.

Operation 3: A PM model 304 (e.g., Recurrent Neural Network, LSTM or similar timeseries prediction model) is trained. The training includes, where given multivariate (e.g., 202) selected PM counters as inputs to PM model 304, PM model 304 predicts energy consumption in the next 24 hours.

Operation 4A PM model 304 (e.g., Recurrent Neural Network, LSTM or similar timeseries prediction model) is further trained. The training includes, where given multivariate (e.g., 202) selected PM counters as inputs to PM model 304, PM model 304 predicts a KPI 314 (e.g., in the next 24 hours).

Operation 5: Referring to FIG. 4, FIG. 4 illustrates training (operation 5) a conditional generative model 302 (e.g., a cVAE model). The training includes, where given the KPI model value (discretized) constraint parameter 402, the target energy consumption value (quantized) 404 (optimization parameter), and corresponding CM dataset 406 as input to the conditional generative model 302, eventually when trained well, the conditional generative model can generate a synthetic but realistic CM dataset 408 with the given conditional variables (including a selected KPI constraint parameter, a value for an optimization parameter (e.g., energy), and a corresponding latent variable (discussed further herein)). If the data distribution in the dataset contains a mixed type such that some attribute range is very small while some are very large, then having a separate scaler for each attribute can help, and which may result in a better span of generated values (between minimum and maximum range) as compared to a case when a single scaler is used. All scalers for each feature in a scalar array can be stored to be used in inverse transformation of generated features of a decoder output of the conditional generative model 302.

Operation 6: Still referring to FIG. 4, FIG. 4 illustrates deployment (operation 6) of conditional generative model 302 (e.g., after training in operation 5) to generate a configuration file(s) (also referred to herein as "configuration data") recommendation(s) 312.

Operation 7: Still referring to FIG. 4, FIG. 4 illustrates evaluation (operation 7) of the trained conditional generative model 302 of operation 5 can be done as follows on the same exact test set (aside from KL divergence and reconstruction loss during training): (a) Infer the energy consumption using CM model 406 of operation 1 (with a real CM dataset and actual values); (b) Infer using a decoder of conditional generative model 302 of operation 5 with the actual, but discrete form, of KPI and energy values; (c) Obtain a difference between the two predictions, and try to minimize the distance between the predictions on the same samples as much as possible.

In order to minimize the distance between the outcome of the two models above, the following may be performed: (1) Re-tune the models, e.g., the KPI prediction model, the timeseries prediction model, the conditional generative model, and/or the CM model that predicts energy and KPI from only a CM dataset; (2) Increase a granularity of the discretization process by increasing the number of bins (e.g., chunks of the energy and KPI dataset); (3) Adjust a standard deviation (to rather a smaller or a larger value) to make the generated configuration as more conservative or more creative; and/or (4) Minimize the distance between the generated configuration and the actual real configuration by in the test set using distance evaluation metrics including K-L divergence, Euclidean distance, cosine similarity, etc. (5) Adjust the weights of the K-L divergence loss and the reconstruction loss.

Figure 7:
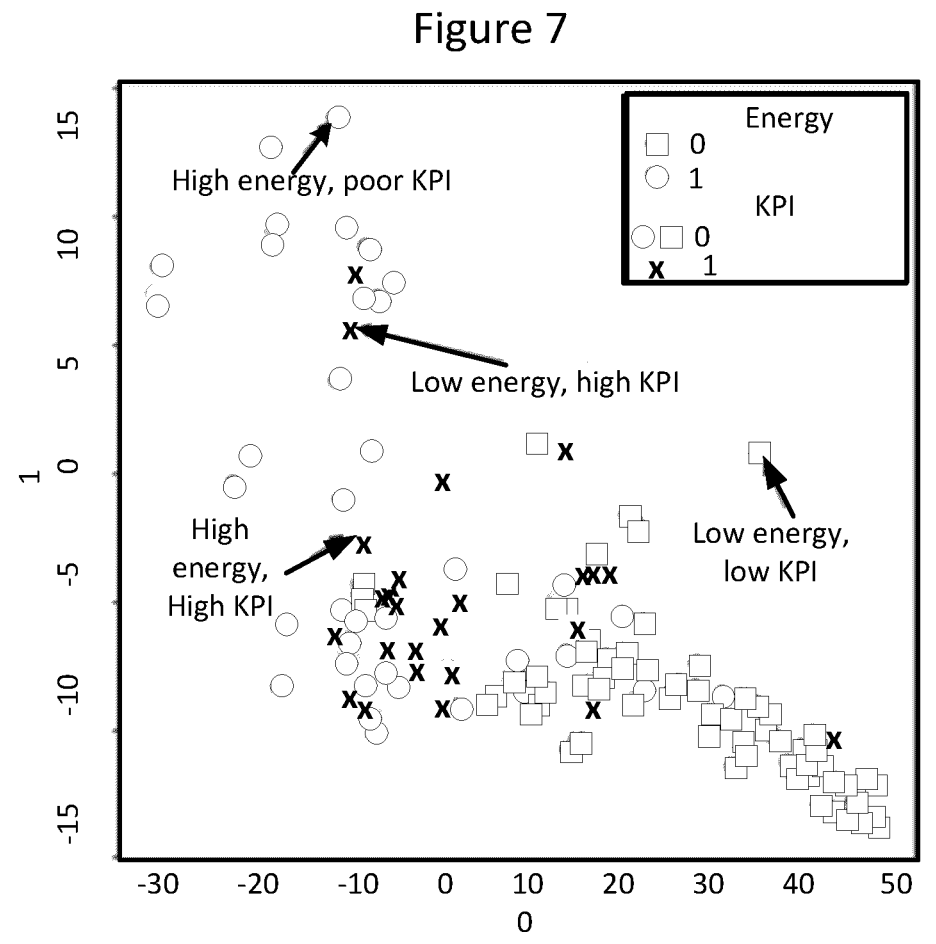

Operation 8: Referring to FIG. 7, perturbate on the energy input variable to the decoder of the conditional generative model 302 (e.g., specifically to a lower value than what is actually predicted), while keeping the predicted KPI value at the same level with the original real predicted value (but discretized form). The perturbation can be done via a random walk on an only possible latent subspace (as described by different regions in FIG. 7 discussed further herein). The perturbation operation can include:

(a) The latent space variables can be generated using the encoder of the conditional generative model 302 such that each input combination value is represented by a latent variable in the latent space.

(b) The latent space variables that represent each predicted category of KPI and energy (discretized values) can be grouped and an array of latent space variables that represent each combination of category are obtained. Eventually, there can be M×N different combinations of latent sub spaces, where M is the total categories of energy and N is the total categories of KPI. The full combination of possibilities is collected in a dictionary or other data format, e.g., a latent_dictionary. A snapshot of an exemplary embodiment is presented below for category (6,3), where 6 represents the category of energy, and 3 represents the category of KPI, where both categorical variables s are ordinal. The corresponding array is all possible latent variables ($z_0$) where that combination of energy, KPI category is represented. Depending on the size of the dimension of latent space, the z parameters can be extended. In the following exemplary embodiment, a 2-D space is used having two z values, $Z_0$ and $Z_1$:

$Z_0 \rightarrow$ (6,3): array ([0.23876373, 0.23977903, 0.2290256, . . . , 0.18574348, 0.18466792], dtype=float32)

$Z_1 \rightarrow$ (6,3): array ([−0.39626187, −0.39674684, −0.3816651 . . . , −0.22742704, −0.22570649], dtype=float32)

(c) Among all possible (e.g., 64 different variables in this exemplary embodiment) latent variables (i.e., $Z_0$--$Z_1$ pairs), one latent variable can be selected via a uniform distribution based selection (e.g., via random.choice (latent_dictionary [(m, n)]), where m is 6 and n is 3 in this exemplary embodiment).

(d) The latent variable with the corresponding category of selected KPIs and energy can then be used as input to the decoder of conditional generative model 302 to generate the configuration data 312.

(e) As a consequence, generation of configuration parameters in configuration data 312 with impossible combinations may be avoided.

Operation 9: Referring again to FIG. 4, during deployment, FIG. 4 illustrates generating (operation 9) the corresponding CM configuration data 312 with the predicted KPI 314 and energy categories (e.g., 24 hours in advance) 316 from prediction model 304. In a case where the generated distribution of the dataset still does not span the full range of the training set, the distribution of the generated synthetic configuration values can be adjusted or scaled with respect to the training minimum maximum range. This can be done with a function, e.g.:

```
def rescale_on_trainingset(x,min_synthetic,max_syn-
    thetic,min_train,max_train):    percentage=(x–
    min_synthetic)/(max_synthetic–min_synthetic)
    return(percentage*(max_train–min_train)+
    min_train.
```

Operation 11: To quantify the energy saving and the potential effect on the KPI, inject the generated configuration data 312 to the pretrained CM model 406 in operations 1 and 2, and infer the (a) energy consumption, and (b) KPI value. The result of operation 11 can be expected (e.g., ideally) to estimate energy consumption that is less than the actual energy consumption, while the estimated KPI is sustained.

In practice, due to discretization and some uncertainty in the dependent machine learning models, the estimated KPI values may deviate slightly. Hence, a tradeoff computation at this point may be necessary or desired, e.g., how much KPI degradation is tolerated with the corresponding energy saving.

Figure 5:
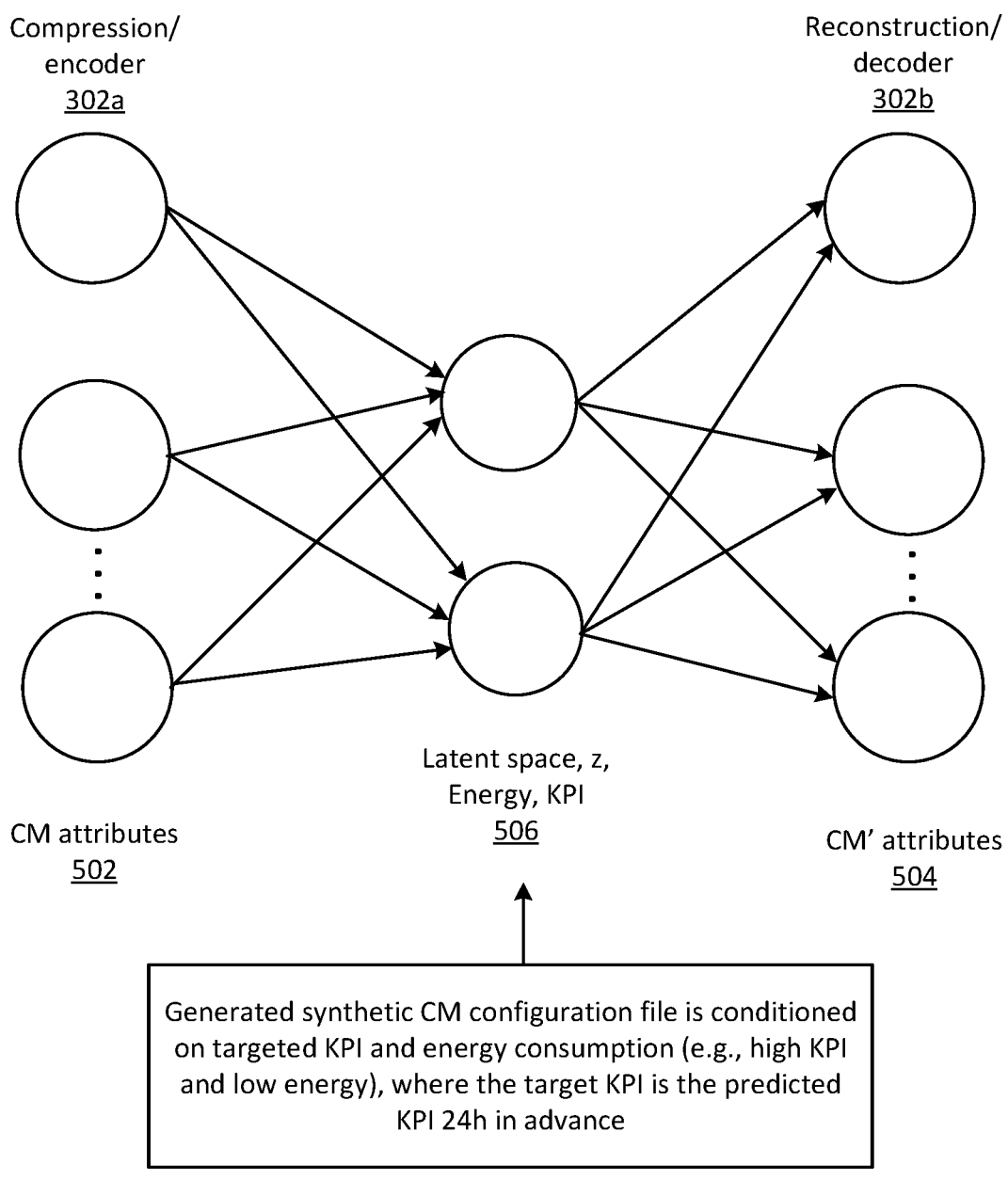
FIG. 5 is a schematic diagram illustrating an exemplary embodiment of training a conditional generative model in accordance with some embodiments of the present disclosure.

FIG. 5 is a schematic diagram illustrating an exemplary embodiment of training a conditional generative model 302 in accordance with some embodiments of the present disclosure. Referring to FIG. 5, latent space variables, z, are generated using encoder 302a of conditional generative model 302 such that each input combination value is represented by a latent variable in the latent space 506. In this exemplary embodiment, the latent space variables that represent each predicted category of KPI and energy (discretized values) can be grouped and an array of latent space variables that represent each combination of category are obtained. Given a target KPI predicted in advance (e.g., 24 hours in advance) by prediction model 304, the target energy consumption value and corresponding CM dataset as input to decoder 302b of conditional generative model 302, the conditional generative model 302 can generate a synthetic but realistic CM data 312 with the given conditional variables (e.g., predicted KPI, energy consumption value, and corresponding latent variables).

Training of an exemplary LSTM prediction model will now be discussed.

In an exemplary embodiment, to sustain SLA KPIs, energy saving recommendations may be done without degrading the quality of experience (QoE) that is a function of a set of KPIs measured and located in PM dataset 204, 206. Thus, conditional generative model 302 is conditioned with a reasonable value for the KPI constraint parameter such that a configuration dataset is reconstructed bounded by the predicted KPI constraint parameter and an optimization parameter (e.g., a low energy consumption).

As a consequence, in some embodiments, prediction model 304 is used for predicting the KPI. Machine learning (ML) based methods are candidates for prediction model 304. PM dataset 204, 206 comprises a timeseries dataset where the performance counters are recorded every hour in an aggregated form, which makes it possible to train a Recurrent Neural Network (RNN) and variants of a RNN, such as Long short term memory (LSTM) to predict the KPI in the future. The inferred value of a well-trained LSTM model 304 then can be used as a conditional variable, X and plugged in as described herein.

In an exemplary embodiment, two hundred and two (202) PM counters of cells are measured, and then aggregated to the node level by taking the sum to obtain one SUM value per hour per node. In an exemplary embodiment, the first four (4) days of a week can be used as training data, and another 2 days of the week as testing data. In this embodiment, the input to LSTM model 302 comprises a multivariant timeseries including w hours of the two hundred and two (202) PM counters; and w, the window size, is set to twelve (12) to yield the reasonable accuracy.

Inference (also preferred to herein as "prediction") via a trained decoder of the conditional generative model is now discussed.

In various embodiments, given that conditional generative model 302 (e.g., including encoder 302a and decoder 302b of a cVAE model) is trained, conditional generative model 302 can execute inference with parameters. The parameters include the conditional variables such as a predicted KPI constraint parameter, and a demanded optimization parameter (e.g., demanded energy consumption) which can be set to a value that is lower or higher than expected or to a specified value. The predicted KPI constraint parameter and the optimization parameter (e.g., energy consumption) are discretized with percentiles. An evaluation can be performed with respect to the number of percentiles. The higher the number of bins, the closer the discretized value may become to its original continuous value. This can yield an increased correlation between the predictions using the data with the original samples and the data using the generated data.

Figure 6:
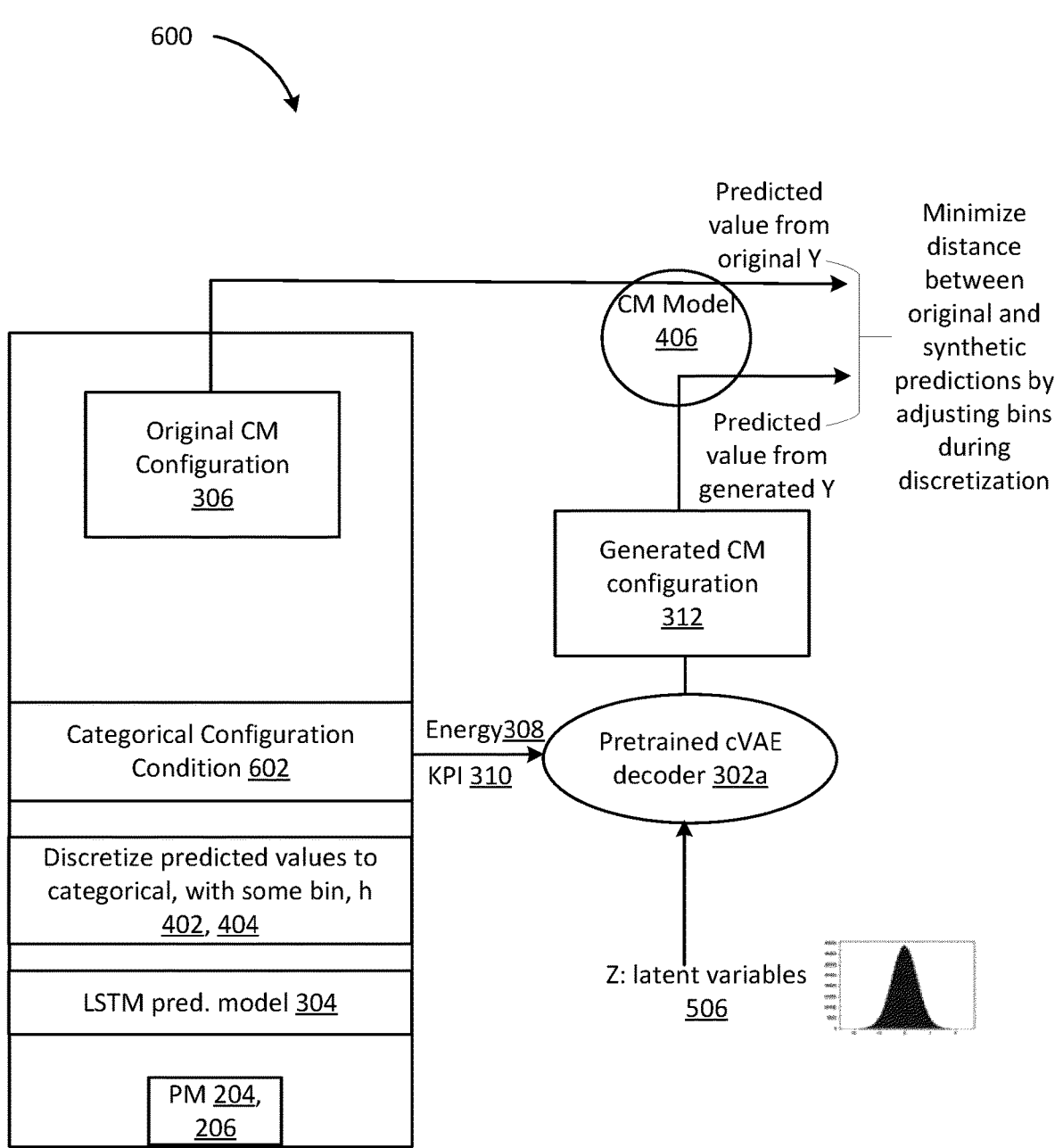
FIG. 6 is a block diagram illustrating an exemplary embodiment of generating recommended CM attributes and evaluating the generated data in accordance with some embodiments of the present disclosure.

FIG. 6 is a block diagram illustrating an exemplary embodiment of generating recommended CM attributes 312 and evaluating the generated data 312 in accordance with some embodiments of the present disclosure. In the exemplary embodiment of FIG. 6, energy consumption using CM model 406 is inferred (with a real CM dataset and actual values). Energy consumption using conditional generative model 302 (with the actual, but discrete form, of KPI and energy values) is inferred. A distance difference between the two predictions is obtained, and operations are performed to try to minimize the distance between the predictions on the samples as much as possible.

FIG. 7 is a plot of an exemplary embodiment of latent space of the input features including low and high energy/ KPI, where the instances that are representations of low and high energy consumption instances appear to be well separated (shown as squares and circles respectively). Still referring to FIG. 7, the learned latent space where the corresponding latent variable points (illustrated as circles and squares) are physically located with respect to the given constraints are illustrated. The circles represent higher energy consumption as compared to the squares and, as illustrated, it appears to be that they are accumulated at different corners of the 2D latent space indicating that conditional generative model 302 learned to compress the most important components that represent the high and low energy consumption.

Choosing an appropriate latent variable will now be discussed. As shown in FIG. 7, different categories are clumped at different latent variables. Therefore, in some embodiments during the data reconstruction phase, the dataset can be generated by drawing samples from the distribution for the corresponding categories. Thus, in an exemplary embodiment, a groupby ("energy_category", "kpi_category") is run and a dictionary (or other data format) is obtained of all possible latent variables per group (as described above in operation 8). Then, in some embodiments, when a latent variable from a particular category combination is to be selected, a random.choice ("default") function can be used that draws a latent variable from the corresponding group in a uniform distribution (meaning that all latent variables have equal chances to be drawn).

Evaluation of the method of various embodiments is now discussed further. In some embodiments, the method is evaluated in two operations. A first operation compares the estimated energy values using generated versus original CM attributes. This operation can be performed as described with reference to FIG. 4. The original CM attributes in the test set are given as input to pretrained CM model 406 that estimates the energy consumption. In parallel, the generated attributes constrained on the discretized energy 404 and the KPI 402 values are given as input to the same pretrained CM model 406.

Estimated values of the two dataset sources can be compared with r2 score and mean absolute error (MAE) evaluation metrics.

Comparing the generated CM attributes where the generated dataset is reconstructed when conditioned on high and low energy consumption values can permit tracking of the potential energy saving from different combinations.

In some embodiments, a second operation for evaluation includes validating a small randomly chosen subset of the generated recommendation configuration file with domain experts 410. Evaluation with support from some active learning ML techniques can also be performed.

Figure 8:
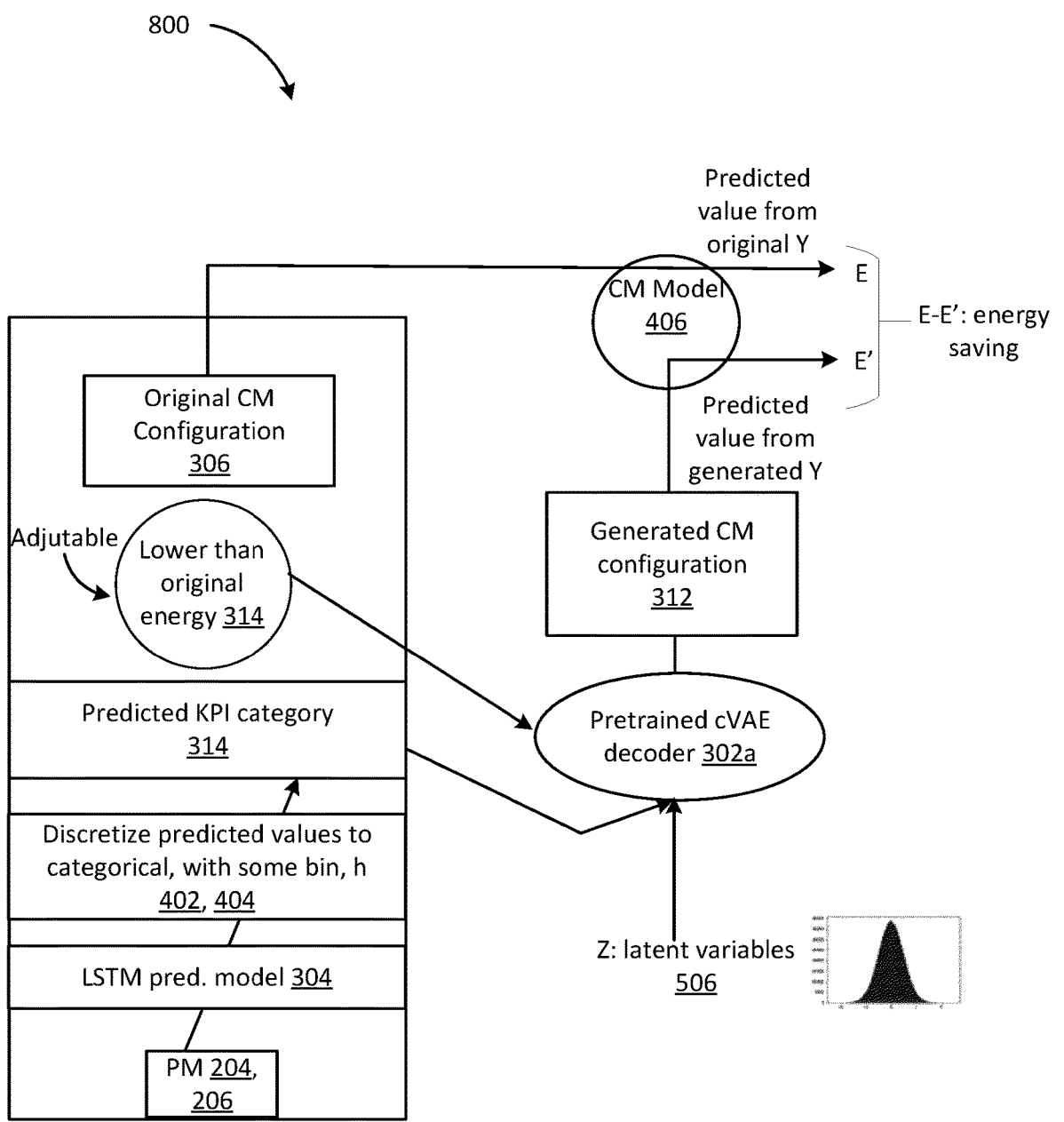
FIG. 8 is a block diagram illustrating an exemplary embodiment of energy consumption in accordance with some embodiments of the present disclosure.

FIG. 8 is a block diagram illustrating an exemplary embodiment of energy consumption estimation of CM model 406 with the real/original CM attributes 306 and when they are synthetically generated 312 via conditional generative model 302 with conditions on low energy consumption 316 and the predicted KPI value(s) 402.

Figures 9, 10, 11:
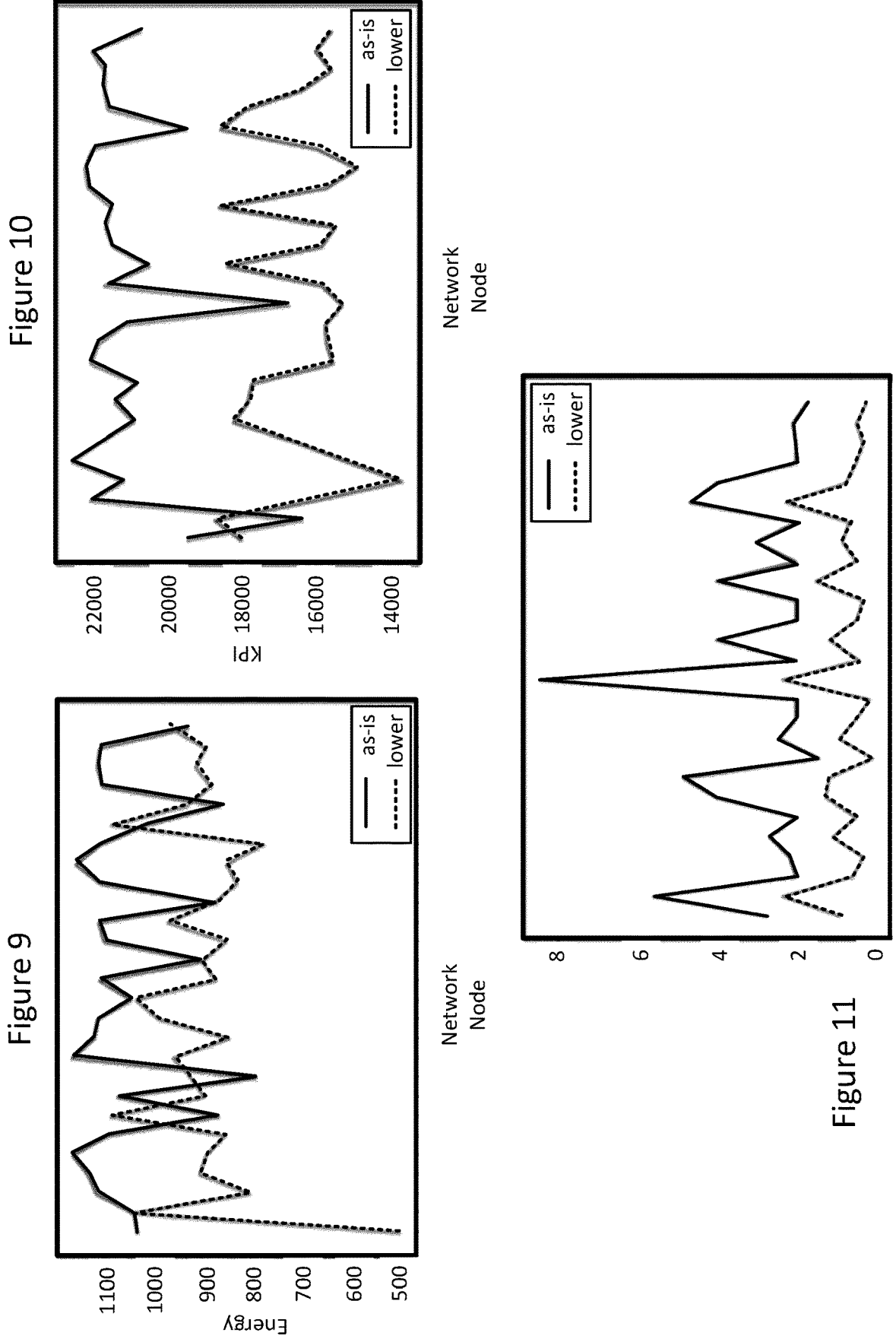
FIGS. 9-10 are plots of exemplary embodiments of quantifying energy savings with a configuration data inference on a test set (efficacy) in accordance with some embodiments of the present disclosure.
FIG. 11 is a plot of an exemplary embodiment of quantifying energy saving with a latent walk on a test set in accordance with some embodiments of the present disclosure.

FIGS. 9-10 are plots of exemplary embodiments of quantifying energy savings with configuration data inference on a test set (efficacy). Each tick in the x-axis of FIGS. 9-10 are for one hour per one node, and the y-axis is the energy consumption. When a slightly minimal energy is given as a condition relative to the original predicted energy consumption, the outcome of a model that gets the generated configuration file as input would yield a relatively less energy consumption (149 kwhr) (as shown in FIG. 9) with a change of 4553.17 units in KPI (as shown in FIG. 10).

FIG. 11 is a plot of an exemplary embodiment of quantifying energy saving with a latent walk on the test set. FIG. 11 illustrates how much an energy can be saved if the latent walk performs on latent variables that represent subspace for the same KPI (as original) but marginally less energy consumption. The x-axis of FIG. 11 is per node and per hour. According to the exemplary embodiment of an evaluation of FIG. 11, a mean energy saving of 2.13 steps (~200 kwhr) can be reached while sustaining the original KPI category on the test set.

It may be risky to execute actions that might, as a side-effect, negatively impact golden parameters or QoE. Thus, a potential advantage provided by various embodiments of the present disclosure may include that in various embodiments of the present disclosure, as the conditional generative model learns to recommend actions, the golden parameters may be sustained.

Additional potential advantages provided by some embodiments may include that reduction of energy consumption may have both potential to lower operating expenses and supporting customers in reaching their sustainability goals (e.g., $CO_2$ reduction).

Further, the method of various embodiments uses software and uses data that is produced by mobile network equipment. As a consequence, the method of various embodiments may not require investment in additional hardware such as node controllers.

The generated configuration data 312 of various embodiments can be installed for base stations as is (e.g., as a full configuration file), as the generated configuration data 312 can sustain the interdependency in between the parameters. This can reduce (or remove completely) manual effort of adjusting/tuning the other parameters that otherwise may not be recommended for change in other approaches.

In an exemplary embodiment, generated configuration data 312 is a two dimensional (2D) matrix, where columns identify the attributes that are generated and each row includes a generated configuration for a network node at a certain time period.

Figure 12:
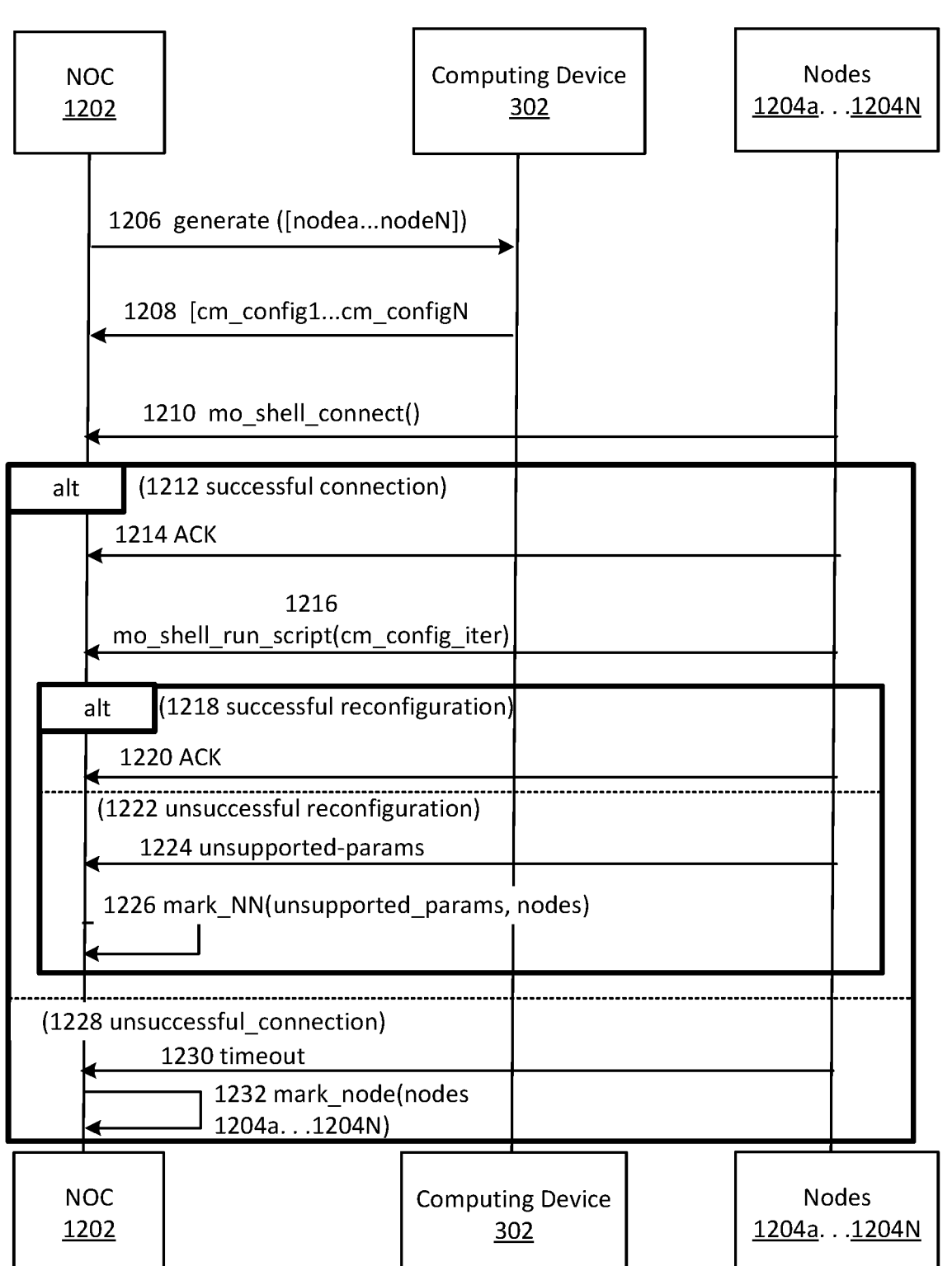
FIG. 12 is a sequence diagram illustrating an exemplary embodiment of operations in accordance with some embodiments of the present disclosure.

FIG. 12 is a sequence diagram illustrating an exemplary embodiment of operations between Network Operations Center (NOC) 1202, computing device 302, and one or more nodes (represented by nodes 1204 . . . 1204n for ease of reference herein). NOC 1202 can handle one or more nodes 1204 . . . 1204n (e.g., network nodes) of the radio network.

Still referring to FIG. 12, NOC 1202 triggers operations in operation 1206 by requesting a CM attribute recommendation for one or more nodes as indicated by input array [node1 . . . nodeN]. Responsive to request 1206, in operation 1208, computing device 302 generates that information as a list of multiple configuration data (or scripts or files) for each node in the same order as indicated previously by the input array. In operation 1210, by way of mo_shell or other secure remote interfaces (e.g., secure shell (SSH)), each node receives the corresponding CM data. Optionally or alternatively, if the connection between NOC 1202 and a node is not established (operation 1228), this can be an indication that the node is misbehaving and, therefore, the new configuration setting may not be applicable and a timeout may occur (operation 1230). Additionally, it may mean that the information (PM parameter space) collected by the node is out of the ordinary and, therefore, that node can be marked (operation 1232).

Still referring to FIG. 12, optionally or alternatively, tracking (operations 1212-1216 and/or 1218-1226) can be performed regarding whether the CM data was enforced to its entirety or not since in certain cases some features produced by computing device 302 may not be enabled for all nodes due to licensing limitations or other reasons.

In some exemplary embodiments, savings (e.g., energy savings) and any impact on the KPI can be quantified, e.g., 14% energy saving, with an impact on KPI by 27% (higher). The quantization can be used to identify whether the quantified numbers are within desired limitations, or are open to improvement by applying the model tuning operations (e.g., as discussed in operation 7 above). A potential impact on the KPI discussed above (27% increase) also can be a result of setting the condition to the predicted KPI value. In cases when this conditional value is set above the predicted KPI, the KPI may be expected to be impacted less with also a potential cost of less energy saving.

Some embodiments of the present disclosure provide a computing device including a conditional generative model based recommendation engine that can output a full recommendation configuration data 312 given demanded parameters such as a low energy consumption optimization parameter and KPI constraint parameters. The method of various embodiments can be generalized to any use case considering a recommendation engine with well-defined conditions.

Figure 13:
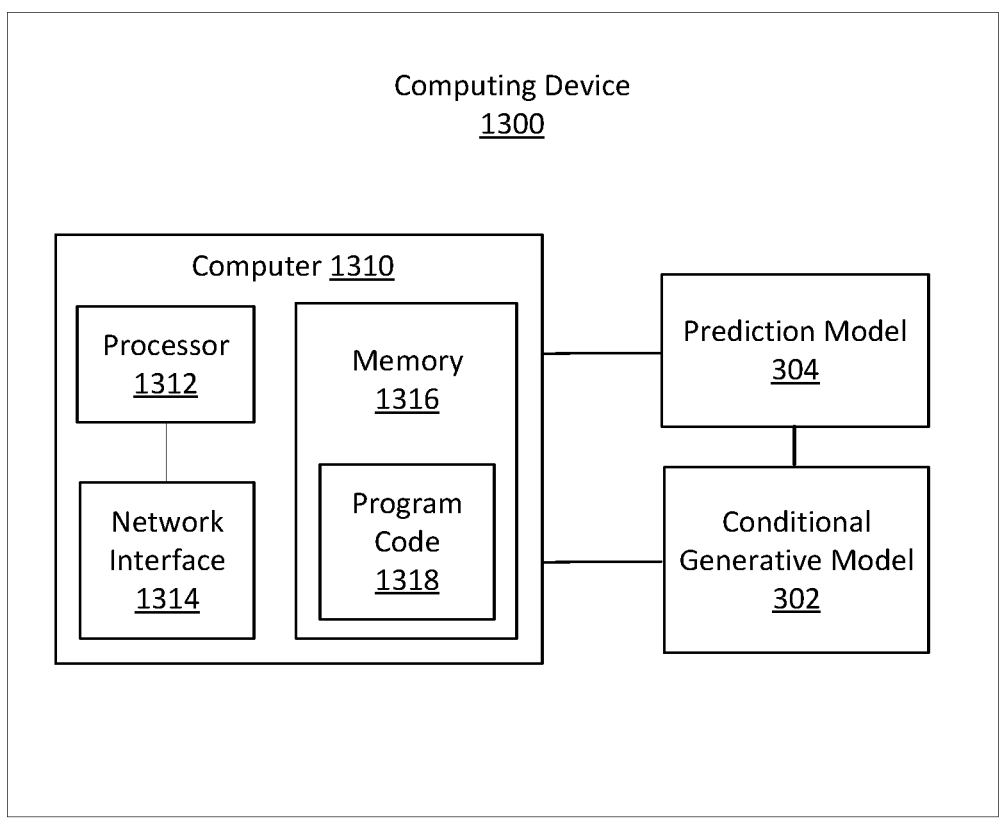
FIG. 13 is a block diagram of a computing device in accordance with some embodiments of the present disclosure.

Now that the operations of the various components have been described, operations specific to a computing device 1300 for a radio network (implemented using the structure of the block diagram of FIG. 13) will now be discussed with reference to the flow charts of FIGS. 14 and 15 according to various embodiments of the present disclosure. As shown in FIG. 13, computing device 1300 may include network interface circuitry 1314 (also referred to as a network interface) configured to provide communications with other nodes of the radio network. Computing device 1300 may also include a processing circuitry 1312 (also referred to as a processor) coupled to the network interface circuitry, and memory circuitry 1316 (also referred to as memory) coupled to the processing circuitry 1312. The memory circuitry 1316 may include computer readable program code that when executed by the processing circuitry 1312 causes the processing circuitry 1312 to perform operations. Further, modules may be stored in memory 1316, and these modules may provide instructions so that when the instructions of a module are executed by respective computer processing circuitry of conditional generative model 302 and/or prediction model 304, processing circuitry of conditional generative model 302 and/or prediction model 304 performs respective operations of the flow charts of FIGS. 14 and 15 according to embodiments disclosed herein.

As discussed herein, operations of the computing device 1300 may be performed by conditional generative model 302 and/or prediction model 304 and/or network interface circuitry 1314. For example, conditional generative model 302 and/or prediction model 304 may control network interface circuitry 1314 to transmit communications through network interface circuitry 1314 to one or more network nodes and/or to receive communications through network interface circuitry from one or more network nodes. Each of the operations described in FIGS. 14 and 15 can be combined and/or omitted in any combination with each other, and it is contemplated that all such combinations fall within the spirit and scope of this disclosure.

Referring to FIG. 14, a method performed by a computing device (e.g., 302, 1300) is provided for a radio network. The method includes receiving (1400) inputs to a conditional generative model, the inputs comprising a value for a predicted key performance indicator, KPI, constraint parameter for a time period, a target value for a optimization parameter, and a latent variable. The method further includes outputting (1402) from the conditional generative model a configuration data for a future time period for a network node of the radio network, wherein the configuration data is bounded by the predicted KPI constraint parameter, the target value for the optimization parameter, and the latent variable.

In some embodiments, the latent variable comprises an encoded representation of a value corresponding to the optimization parameter and a value corresponding to the KPI constraint parameter.

In some embodiments, the target value for the optimization parameter has a value from a plurality of variable values, wherein each variable value in the plurality of variable values represents a combination of a value of a category of a KPI from a plurality of KPI constraint parameters and a value of a optimization parameter associated with the category of the KPI from the plurality of KPI constraint parameters.

In some embodiments, the configuration data includes a plurality of settings for each of a plurality of configuration management attributes and hardware for the network node, respectively.

In some embodiments, the value for the predicted KPI constraint parameter and the target value for the optimization parameter are each received from a prediction model and wherein the prediction model includes a model trained with a performance management dataset.

In some embodiments, the performance management dataset includes a multivariate timeseries form of periodic performance management counters aggregated at a network node level in the radio network.

Referring to FIG. 15, in some embodiments, the method further includes training (1500) a configuration management model. The training (1500) includes inputting a set of configuration management attributes to the configuration management model and outputting from the configuration management model a value for the KPI constraint parameter and a value for the optimization parameter. The method further includes training (1502) a performance management model. The training (1502) includes inputting a set of performance management data to the performance management model and outputting from the performance management model a prediction for the KPI constraint parameter for the time period and a prediction for the optimization parameter for the time period.

In some embodiments, the method further includes training (1504) the conditional generative model with a configuration management dataset including a plurality of configuration management attributes and a corresponding plurality of conditional variables. Each of the plurality of configuration management attributes is associated with a corresponding conditional variable comprising the configuration management attributes and a corresponding quantized form of each of the KPI constraint parameter and the target value for the optimization parameter. The training (1504) the conditional generative model includes receiving as an input to the conditional generative model all configuration managements attributes associated with the corresponding plurality of conditional variables, and outputting a synthetic configuration file for the network node based on the input.

In some embodiments, the configuration management dataset includes data for a first granularity and wherein the set of performance management data comprises data for a second granularity; and the method further includes applying (1506) inverse transformation on the configuration management dataset to distribute the configuration management dataset on a greater granularity level compared to the first granularity prior to applying the inverse transformation.

In some embodiments, the method further includes evaluating (1508) the conditional generative model. The evaluating includes (1) predicting from a configuration management model the target value using an original configuration data, (2) predicting from the conditional generative model the target value using a generated configuration data, wherein the generated configuration data corresponds to the an original state of the radio network via the predicted KPI constraint parameter and the optimization parameter, (3) obtaining a distance between the original configuration data and the generated configuration data, and (4) reducing the distance.

In some embodiments, the reducing the distance comprises at least one of: retuning the configuration management model and the conditional generative model, respectively; increasing a granularity of a discretization process for obtaining the quantized value of the KPI constraint parameter and the quantized value for the optimization parameter; adjusting a standard deviation in the conditional generative; and using a distance evaluation metric, wherein the distance evaluation metric comprises at least one of a KL divergence, a Euclidean distance, a coefficient of determination, and a cosine similarity.

In some embodiments, the method further includes obtaining (1510) the target value for the optimization parameter based on perturbating on the optimization parameter while maintaining the value for at least one predicted KPI constraint parameter.

In some embodiments, the perturbating includes generating the plurality of variables using an encoder of the conditional generative model based on embedding a representation of a configuration data comprising different values of the predicted KPI constraint parameter and different values of the optimization parameter, and selecting the target value for the optimization parameter from the plurality of variables via a uniform distribution based selection.

In some embodiments, the method further includes quantifying (1512) a performance result for the configuration data. The quantifying comprises inputting the configuration data to a configuration management model, outputting from the configuration management model a value for the KPI parameter constraint parameter and a value for the optimization parameter.

In some embodiments, the optimization parameter is an energy consumption of the network node; the target value for the optimization parameter comprises a value for the energy consumption of the network node that is lower than a value for the energy consumption from an embedded representation of configuration data including different values of the predicted KPI constraint parameter and different values of the energy consumption; and the predicted KPI constraint parameter includes at least one or more of a radio resource control connection setup success rate, a call setup success ratio per data, a cell throughput in uplink and downlink, a cell utilization, a level of interference, latency in uplink and downlink, coverage quality of service (QOS) metrics including, without limitation, reference signal received power (RSRP), signal quality Qos metrics including, without limitation, reference signal received quality (RSRQ), a traffic data volume in uplink and downlink, an intra and/or inter frequency handover success rate.

The various operations 1500-1512 from the flow chart of FIG. 15 may be optional with respect to some embodiments of a method performed by a computing device for radio network.

Example embodiments are discussed below.

Embodiment 1. A method performed by a computing device for a radio network is provided. The method includes receiving (1400) inputs to a conditional generative model. The inputs include a value for a predicted key performance indicator, KPI, constraint parameter for a time period, a target value for a optimization parameter, and a latent variable. The method further includes outputting (1402) from the conditional generative model a configuration data for a future time period for a network node of the radio network. The configuration data is bounded by the predicted KPI constraint parameter, the target value for the optimization parameter, and the latent variable.

Embodiment 2. The method of Embodiment 1, wherein the latent variable includes an encoded representation of a value corresponding to the optimization parameter and a value corresponding to the KPI constraint parameter.

Embodiment 3. The method of any of Embodiments 1 to 2, wherein the target value for the optimization parameter has a value from a plurality of variable values. Each variable value in the plurality of variable values represents a combination of a value of a category of a KPI from a plurality of KPI constraint parameters and a value of a optimization parameter associated with the category of the KPI from the plurality of KPI constraint parameters.

Embodiment 4. The method of any of Embodiments 1 to 3, wherein the configuration data includes a plurality of settings for each of a plurality of configuration management attributes and hardware for the network node, respectively.

Embodiment 5. The method of any of Embodiments 1 to 4, wherein the value for the predicted KPI constraint parameter and the target value for the optimization parameter are each received from a prediction model and wherein the prediction model includes a model trained with a performance management dataset.

Embodiment 6. The method of Embodiment 5, wherein the performance management dataset includes a multivariate timeseries form of periodic performance management counters aggregated at a network node level in the radio network.

Embodiment 7. The method of any of Embodiments 1 to 6, further including training (1500) a configuration management model. The training (1500) includes inputting a set of configuration management attributes to the configuration management model and outputting from the configuration management model a value for the KPI constraint parameter and a value for the optimization parameter. The method further includes training (1502) a performance management model. The training (1502) includes inputting a set of performance management data to the performance management model and outputting from the performance management model a prediction for the KPI constraint parameter for the time period and a prediction for the optimization parameter for the time period.

Embodiment 8. The method of any of Embodiments 1 to 7, further including training (1504) the conditional generative model with a configuration management dataset including a plurality of configuration management attributes and a corresponding plurality of conditional variables. Each of the plurality of configuration management attributes is associated with a corresponding conditional variable including the configuration management attributes and a corresponding quantized form of each of the KPI constraint parameter and the target value for the optimization parameter. The training (1504) the conditional generative model includes receiving as an input to the conditional generative model all configuration managements attributes associated with the corresponding plurality of conditional variables, and outputting a synthetic configuration file for the network node based on the input.

Embodiment 9. The method of any of Embodiments 7 to 8, wherein the configuration management dataset includes data for a first granularity and the set of performance management data includes data for a second granularity. The method further includes applying (1506) inverse transformation on the configuration management dataset to distribute the configuration management dataset on a greater granularity level compared to the first granularity prior to applying the inverse transformation.

Embodiment 10. The method of any of Embodiments 1 to 9, further including evaluating (1508) the conditional generative model. The evaluating includes (1) predicting from a configuration management model the target value using an original configuration data, (2) predicting from the conditional generative model the target value using a generated configuration data. The generated configuration data corresponds to the an original state of the radio network via the predicted KPI constraint parameter and the optimization parameter, (3) obtaining a distance between the original configuration data and the generated configuration data, and (4) reducing the distance.

Embodiment 11. The method of Embodiment 10, wherein the reducing the distance includes at least one of: retuning the configuration management model and the conditional generative model, respectively; increasing a granularity of a discretization process for obtaining the quantized value of the KPI constraint parameter and the quantized value for the optimization parameter; adjusting a standard deviation in the conditional generative; and using a distance evaluation metric. The distance evaluation metric includes at least one of a KL divergence, a Euclidean distance, a coefficient of determination, and a cosine similarity.

Embodiment 12. The method of any of Embodiments 1 to 11, further including obtaining (1510) the target value for the optimization parameter based on perturbating on the optimization parameter while maintaining the value for at least one predicted KPI constraint parameter.

Embodiment 13. The method of Embodiment 11, wherein the perturbating includes generating the plurality of variables using an encoder of the conditional generative model based on embedding a representation of a configuration data comprising different values of the predicted KPI constraint parameter and different values of the optimization parameter, and selecting the target value for the optimization parameter from the plurality of variables via a uniform distribution based selection.

Embodiment 14. The method of any of Embodiments 1 to 13, further including quantifying (1512) a performance result for the configuration data. The quantifying includes inputting the configuration data to a configuration management model, outputting from the configuration management model a value for the KPI parameter constraint parameter and a value for the optimization parameter.

Embodiment 15. The method of any of Embodiments 1 to 14, wherein the optimization parameter is an energy consumption of the network node, wherein the target value for the optimization parameter comprises a value for the energy consumption of the network node that is lower than a value for the energy consumption from an embedded representation of configuration data comprising different values of the predicted KPI constraint parameter and different values of the energy consumption, and wherein the predicted KPI constraint parameter includes at least one or more of a radio resource control connection setup success rate, a call setup success ratio per data, a cell throughput in uplink and downlink, a cell utilization, a traffic data volume in uplink and downlink, an intra and/or inter frequency handover success rate.

Embodiment 16. A computing device (302, 1300) including a conditional generative model (302a, 302b) for a radio network. The computing device includes at least one processor (1312); and at least one memory (1316) connected to the at least one processor (1312) and storing program code that is executed by the at least one processor to perform operations. The operations include receive inputs to a conditional generative model. The inputs include a value for a predicted key performance indicator, KPI, constraint parameter for a time period, a target value for a optimization parameter, and a latent variable. The operations further include output from the conditional generative model a configuration data for a future time period for a network node of the radio network. The configuration data is bounded by the predicted KPI constraint parameter, the target value for the optimization parameter, and the latent variable.

Embodiment 17. The computing device (302, 1300) of Embodiment 16, wherein the at least one memory (1316) connected to the at least one processor (1312) and storing program code that is executed by the at least one processor to perform further operations according to Embodiments 2 to 15.

Embodiment 18. A computing device (302, 1300) including a conditional generative model (302a, 302b) for a radio network. The computing device is adapted to perform operations including receiving inputs to a conditional generative model. The inputs include a value for a predicted key performance indicator, KPI, constraint parameter for a time period, a target value for a optimization parameter, and a latent variable. The operations further include outputting from the conditional generative model a configuration data for a future time period for a network node of the radio network. The configuration data is bounded by the predicted KPI constraint parameter, the target value for the optimization parameter, and the latent variable.

Embodiment 19. The computing device (302, 1300) of Embodiment 18 adapted to perform further operations according to any of Embodiments 2 to 15.

Embodiment 20. A computer program including program code to be executed by processing circuitry (1312) of a computing device (302, 1300) including a conditional generative model (302a, 302b) for a radio network, whereby execution of the program code causes the computing device to perform operations. The operations include receive inputs to a conditional generative model. The inputs include a value for a predicted key performance indicator, KPI, constraint parameter for a time period, a target value for a optimization parameter, and a latent variable. The operations further include output from the conditional generative model a configuration data for a future time period for a network node of the radio network. The configuration data is bounded by the predicted KPI constraint parameter, the target value for the optimization parameter, and the latent variable.

Embodiment 21. The computer program of Embodiment 20, whereby execution of the program code cause the computing device (302, 1300) to perform further operations according to any of Embodiments 2 to 15.

Embodiment 22. A computer program product including a non-transitory storage medium including program code to be executed by processing circuitry (1312) of a computing device (302, 1300) including a conditional generative model (302a, 302b) for a radio network, whereby execution of the program code causes the computing device to perform operations. The operations include receive inputs to a conditional generative model. The inputs include a value for a predicted key performance indicator, KPI, constraint parameter for a time period, a target value for a optimization parameter, and a latent variable. The operations further include output from the conditional generative model a configuration data for a future time period for a network node of the radio network. The configuration data is bounded by the predicted KPI constraint parameter, the target value for the optimization parameter, and the latent variable.

Embodiment 23. The computer program product of Embodiment 21, whereby execution of the program code causes the computing device (302, 1300) to perform further operations according to any of Embodiments 2 to 15.

Another example use case in an intent driven network is now discussed. In some existing approaches, intent-based network management is introduced (see e.g., https://wiki.o-nap.org/pages/viewpage.action?pageId=84644984& preview=/84644984/84 655111/20200624% 20LFN %20DTF %20ONAP-A1%20JohnKeeney.pdf (accessed on 3 Oct. 2021)) to simplify the way that mobile networks are managed and configured. A main idea is to manage a network via intents which are high level constructs that define the mission of a network, and then allow the network to internally decide how to fulfill that mission and make use of more network specific actions that are particular to its inner workings to realize this. An analogy for this would be any programming language and any compiler that converts that language into more specific instructions for the underlying processors. Unlike processors with unique instruction sets, a challenge when applying intents in a network may be that it can be extremely hard to construct an intent in such a way that captures the "consequences" (or side effects) of the requests that are being made.

For example, a simple intent may be to prioritize the streaming channel for a camera of a firefighter that is closer to the fire source than other firefighters that are further away. Verbatim application of that intent might yield problems because, e.g., if there are remote controlled devices that are also approaching the area, their traffic might be down prioritized and, thus, it may be impossible to steer those devices.

In the context of energy management, an intent can be to configure a network in such a way that it is energy efficient (in other words, the network should consume less power). However, exact application of that intent may eventually turn off various parts of the network; and consequently, other parts of the network may break while fixing only one part of interest. As a consequence, the network may be unusable.

Figure 17:
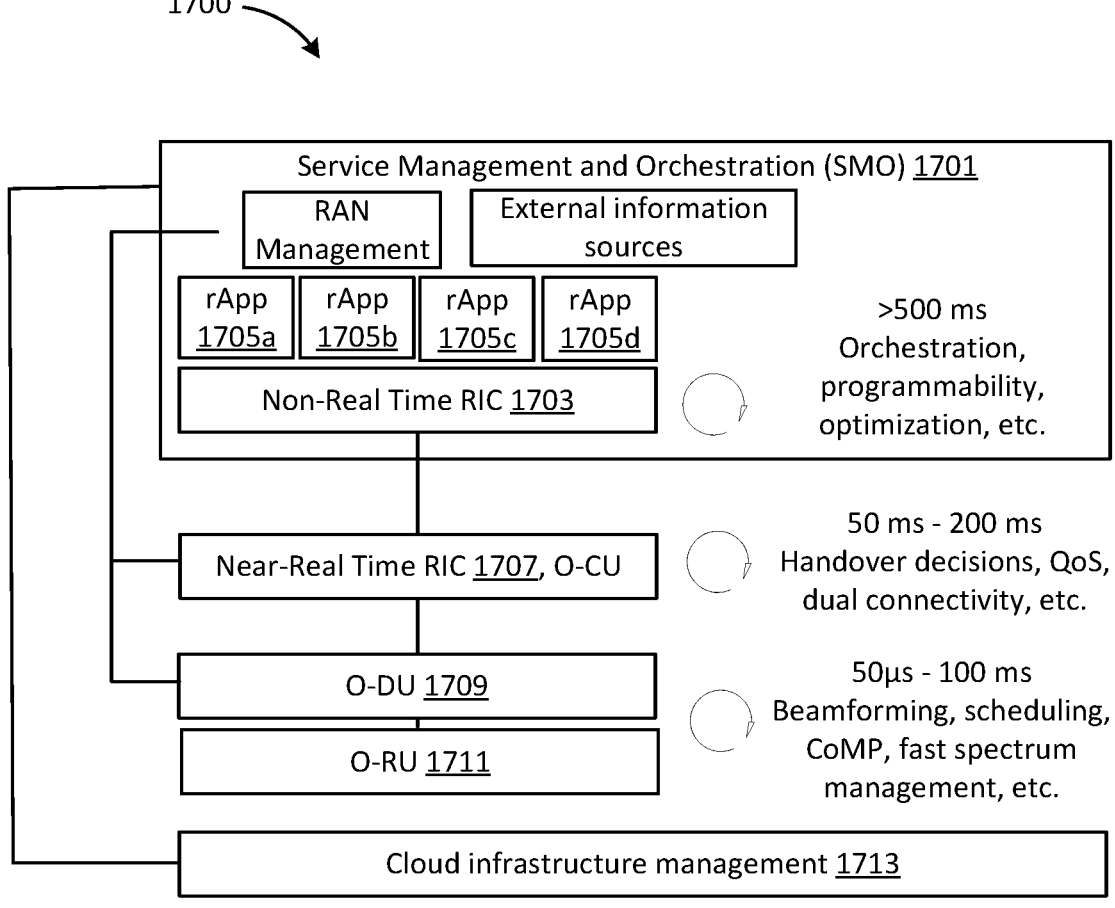
FIG. 17 is a block diagram illustrating next generation management and orchestration 1700 as defined by O-RAN Alliance.

FIG. 17 is a block diagram illustrating next generation management and orchestration 1700 as defined by O-RAN Alliance. The illustrated next generation management and orchestration includes a number of interworking components includes: the Service Management and Orchestration (SMO) 1701, non-real time radio intelligent controller (RIC) 1703, radio access network (RAN) applications (rApps) 1705*a*, 1705*b*, 1705*c*, 1705*d*, and the interfaces O1, O2, and A1 allowing for communication between these components. The example next generation management and orchestration

1700 also includes near-real time RIC 1701, ORAN Distributed Unit (O-DU) 1709, ORAN radio unit (O-RU) 1711 and cloud infrastructure management 1713.

In some embodiments of the present disclosure, the method makes use of observability and generative models to find potential consequences an intent may have on a network within the PM and CM space and generate the different actions (parameters configurations) to implement the intent in such a way that captures the expected impact.

Figure 18:
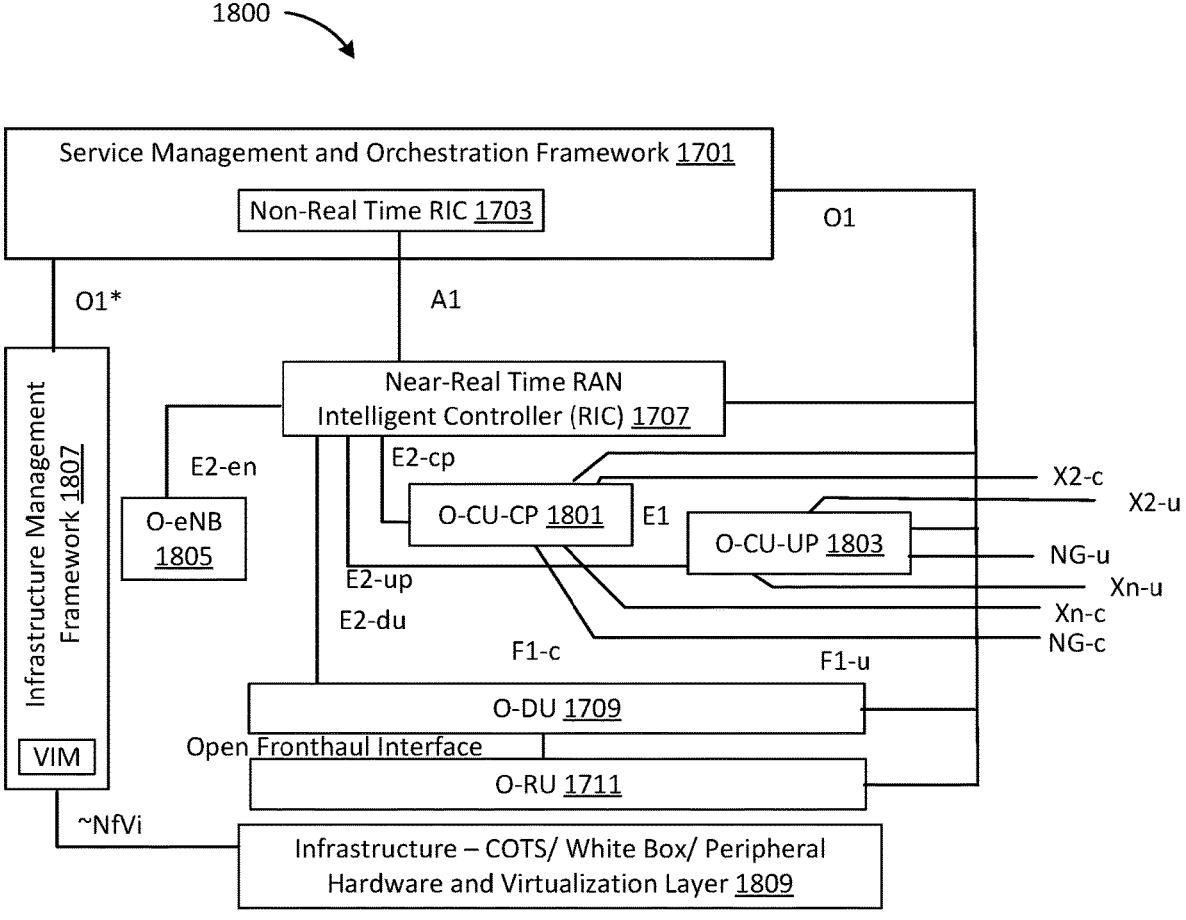
FIG. 18 is a block diagram illustrating an overview of an Open RAN (ORAN) architecture.

FIG. 18 is a block diagram illustrating an overview of an Open RAN (ORAN) architecture. In the ORAN architecture 1800, the radio side includes near-real time RAN RIC 1707, O-CU-CP 1801, O-CU-UP 1803, O-DU 1709, and O-RU 1711. Near-real time RAN RIC 1707 is communicatively connected to ORAN eNodeB (O-eNB) 1805. The management side includes SMO Framework 1701 that includes a non-real time RIC 1703 function. The O1 interface enables access to PM and CM information from O-DUs and O-RUs. The O1*interface enables access to infrastructure management framework 1807. Infrastructure management structure 1807 is communicatively connected to infrastructure 1809 (e.g., COTS, white box, peripheral hardware, virtualization layers, etc.)

In some embodiments, the method uses SMO framework 1701 and non-real time RIC 1703 to receive intents and communicate with other parts of the network infrastructure cloud infrastructure 1809.

In some embodiments, entry to the ORAN architecture 1800 is an intent interface where intent policies are given either by an external component or by a third party applications. Intents are higher-level declarative policies, typically expressed in a simplified form (for example using natural language). Since intents are high-level, they need to be mapped to more low-level constructs. A low-level policy is a set of rules that are used to manage and control changes or to keep the state of one or more managed objects such as nodes in a network. Low-level intents can be either imperative or declarative. Imperative low-level intents hold explicit information about what needs to be done for the desired state to be achieved while declarative intents only supply the expected state and then allow the system to decide on its own how that should be achieved.

Figure 19:
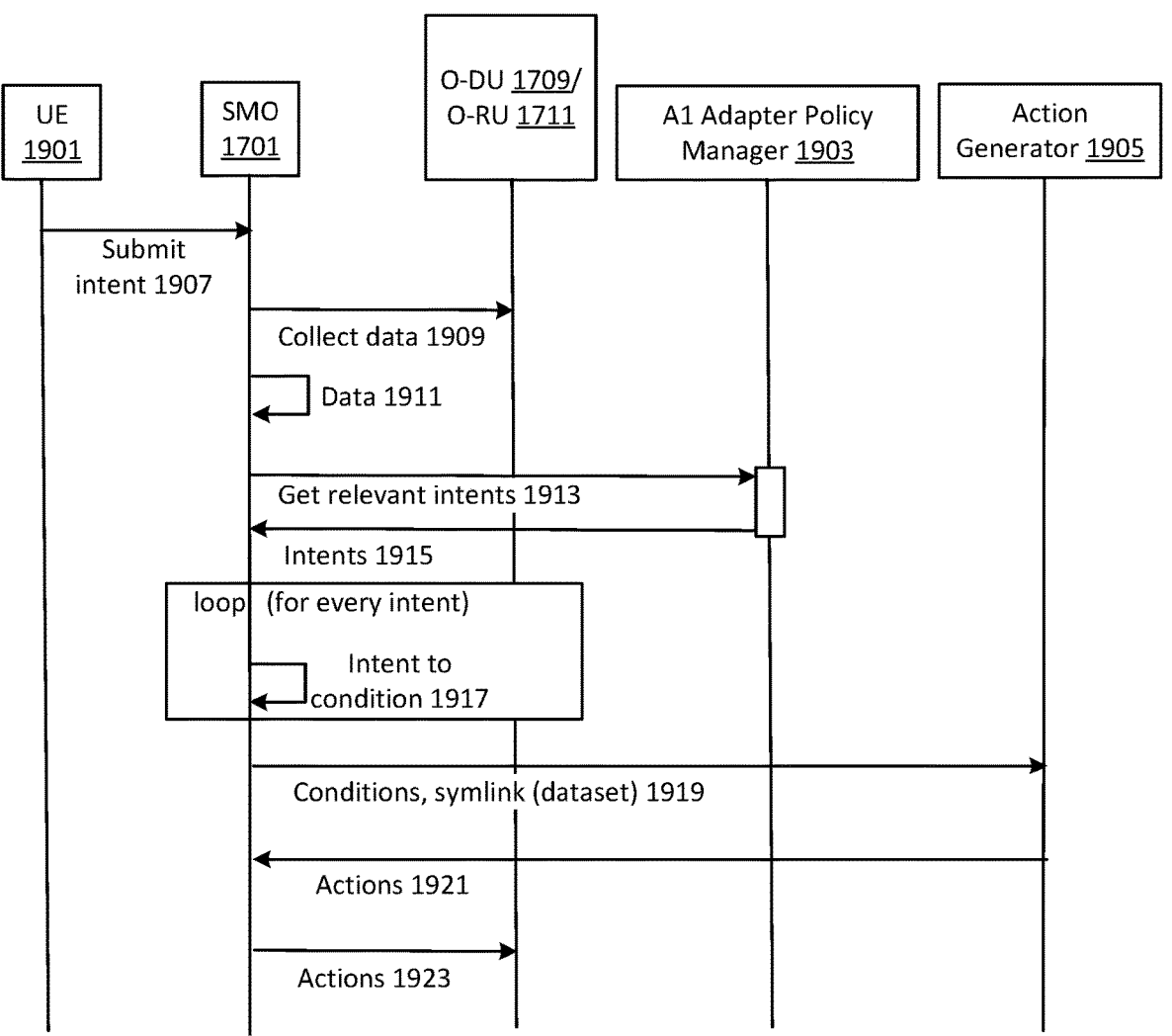
FIG. 19 is a sequence diagram illustrating operations in accordance with some embodiments of the present disclosure . . .

FIG. 19 is a sequence diagram illustrating operations among a user equipment (UE) 1901, SMO framework 1701, O-DU 1709/O-RU 1711, an A1 adapter policy manager 1903, and an action generator 1905 in accordance with some embodiments of the present disclosure.

Referring to FIG. 19, in operation 1907, UE 1901 sends an intent to SMO framework 1701. An example of an intent is shown below:

```
Example of low-level policy for energy management:
tosca_definitions_version: tosca_simple_yaml_1_1_0
topology_template:
  policies:
    -
      onap.restart.tca:
        type: onap.policies.monitoring.tcagen2
        type_version: 1.0.0
        version: 1.0.0
        name: onap.restart.tca
        metadata:
          policy-id: onap.restart.tca
        policy-version: 1
        properties:
          tca.policy:
            domain: measurementForEnergy
            metricsPerEventName:
              -
```

-continued

```
eventName: Measurement_vGMUX
controlLoopSchemaType: VNF
policyScope: DCAE
policyName: "DCAE.Config_tca-hi-lo"
policyVersion: "v0.0.1"
thresholds:
    -
            closedLoopControlName: "ControlLoop-vCPE-48f0c2c3-a172-4192-9ae3-
052274181b6e"

version: "1.0.2"
            fieldPath: "$.pmConsumedEnergy[*].arrayOfFields[0].value"
            thresholdValue: 300
            direction: EQUAL
            severity: MAJOR
            closedLoopEventStatus: ABATED -
            closedLoopControlName: "ControlLoop-vCPE-48f0c2c3-a172-4192-9ae3-
052274181b6e"

version: "1.0.2"
            fieldPath: "$.pmConsumedEnergy[*].arrayOfFields[0].value"
            thresholdValue: 600
            direction: GREATER
            severity: CRITICAL
            closedLoopEventStatus: ONSET -
            closedLoopControlName: "ControlLoop-vCPE-48f0c2c3-a172-4192-9ae3-
052274181b6e"

version: "1.0.2"
            fieldPath: "$. pmRrcConnEstabAtt [*].arrayOfFields[0].value"
            thresholdValue: 20000
            direction: EQUAL
            severity: MAJOR
            closedLoopEventStatus: ABATED -
            closedLoopControlName: "ControlLoop-vCPE-48f0c2c3-a172-4192-9ae3-
052274181b6e"

version: "1.0.2"
            fieldPath: "$. pmRrcConnEstabAtt [*].arrayOfFields[0].value"
            thresholdValue: 30000
            direction: GREATER
            severity: CRITICAL
            closedLoopEventStatus: ONSET
```

In operation 1907, SMO framework 1701 receives this input (e.g., the example intent described above expressed in constrained form is 300<=pmConsumedEnergy <=600 and 20000<=pmRrcConnEstabAtt<=30000).

In operation 1909, SMO framework 1701 starts acquiring data from O-DUs 1709 and O-RUs 1711 using the 01 observability interface. In an example embodiment for the example intent described above, the information that is collected is PM and CM data and not user plane data.

In operation 1911, SMO framework 1701 has the acquired dataset. An example dataset is shown below:

| Network device | Day | EutrancellFDD_cell_Id_unique_count | EutrancellFDD_cellRange_mean | . . . |
|---|---|---|---|---|
| Device 1 | 2 | 3 | 2 | |
| Device 2 | 8 | 9 | 15 | |

| | Network device | Day | pmConsumedEnergy | pmNetwork_pmRrcConnEstabAtt_sum |
|---|---|---|---|---|
| | Device 1 | 2 | 850 | 192 |
| | Device 2 | 8 | 630 | 130 |

In operations 1913 and 1915, SMO framework 1701 gets other relevant intents that already have been submitted in this network from Adapter Policy Manager 1903 using the A1 interface. In some embodiments, the Adapter Policy Manager 1903 is a registry for this information. It is noted that, currently, the A1 interface cannot perform such a query; and it queries based on policy ID. Thus, in some embodiments, the A1 interface is extended to perform more complex queries within the same period, e.g., within about 5 ms-500 ms. An example of an such an intent that may already exist in the system is that pmConsumedEnergy for node AB123 should not exceed 200 (ab123.pmConsumedEnergy<=200).

In operation 1917, subsequent to collection of all relevant intents, the intents are converted to conditions to be used by a Conditional Variational Autoencoder (cVAE) (e.g., cVAE 302) that uses the dataset from operation 1907, and the input conditions to generate different CM attributes that will be used as actions to achieve what is expected.

In operation 1917, corresponding datasets are created that are needed for each condition and quantizing them to different scales. Operation 1917 is repeated in a loop for every intent. The quantization then used as a label. In the example embodiment for the example intent discussed for FIG. 19, pmConsumedEnergy and pmRrcConnEstabAtt are handled, one dataset is needed for each. [df_energy, df_rrc]. For each level of energy and Radio Resource Control (RRC) connections, one or more columns are added as dictated by one one-hot-encoded. One-hot-encoding is a way of producing a unique binary label for each sample. Alternatively, in some embodiments, each sample is labelled using a LabelEncoder. An example is shown below:

Let arr=[100, 100, 20, 150, 120, 130, 160, 170, 200, 500, 600, 100, 300, 400] be a list which contains different values of pmConsumedEnergy from different nodes. A Label encoding for this array would be→ arr_encoded=[1, 1, 0, 4, 2, 3, 5, 6, 7, 10, 11, 1, 8, 9]

Operation 1917 allows governing of the cVAE (e.g., cVAE 302) when it comes to choosing different samples later on when generating new data under condition. These labels (and their combination) can be used afterwards to govern the training process of the CVAE. The CVAE can use as input the original dataset collected by the O-DU 1709 and O-RU 1711 and the two new datasets for each condition.

In operations 1919 and 1921, the cVAE (e.g., cVAE 302) is trained. As discussed herein, in some embodiments, the cVAE (e.g., cVAE 302) includes three components:

1) The encoder includes an input layer which is the concatenation of the input features which can be used for generating new data, their labels, and more conditions. This can then be encoded in a dense layer which encodes this input. Thereafter this can be connected to a layer that produces the mean and the standard deviation of the variational sampling.

2) The latent space is the next layer which produces the latent representation using the mean and the standard deviation produced in the encoding step.

3) The decoder is the final component which is tasked to reconstruct the input using the information from the latent space.

In some embodiments, the cVAE architecture is the same as a VAE architecture with the exceptions that the input contains additional information such as labels and conditions. This additional information is used to generate new samples that are bounded by the conditions (labels and conditions). See e.g., 1606.05908.pdf (arxiv.org) (accessed on 3 Oct. 2021).

Once the cVAE (e.g., cVAE 302) is trained, it can be used to generate new samples that are bounded by the conditions described herein. In some embodiments, the output is a data frame enhanced with an additional column that contains the reconstruction loss [x'-x]. An example is shown below:

sample is to reality (or to the original distribution). The higher the value, the more the distance between the reconstructed synthetic sample and the original sample. KL Divergence loss is another similarity loss metric that quantifies how likely the reconstructed sample relates to the real sample distribution. The overall loss is often the weighted sum of the two to sustain a right balance between creativity while still aiming to generate reasonable output.

In operation 1923, new actions can either be sent directly to the O-RU 1711 and O-DU 1709 and affect their configuration (e.g., change transmit power (TxPower), enable/disable cell, etc.) or the new actions can be bundled in a network function (NF) and deployed in the network using the O1*interface.

Explanations are provided below for various abbreviations/acronyms used in the present disclosure.

Abbreviation Explanation
VAE Variational Autoencoder
CVAE Conditional Variational Autoencoder
RFT Random Forest Tree
PM Performance Management
CM Configuration Management
OPEX Operating Expenses
NOC Network Operations Center
SLA Service Level Agreement
References are identified below.
https://arxiv.org/pdf/1606.05908.pdf
Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein are described more fully with reference to the accompanying drawings. Other embodiments, however, are contained within the scope of the subject matter disclosed herein, the disclosed subject matter should not be construed as limited

| Network device | Day | EutrancelIFDD_cellId_unique_count | EutrancelIFDD_cellRange_mean | . . . |
|---|---|---|---|---|
| Device 1 | 2 | 1 | 1 | |
| Device 2 | 8 | 6 | 3 | |

| Network device | Day | pmConsumedEnergy | pmNetwork_pmRrcConnEstabAtt_sum | Reconstruction_loss |
|---|---|---|---|---|
| Device 1 | 2 | 350 | 70 | 0.18 |
| Device 2 | 8 | 580 | 80 | 0.17 |

Reconstruction loss is the root mean square error (RMSE) between the real sample and the one that is generated. As such, it can be used as a metric to explain how close that to only the embodiments set forth herein; rather, these embodiments are provided by way of example to convey the scope of the subject matter to those skilled in the art.

Figure 16:
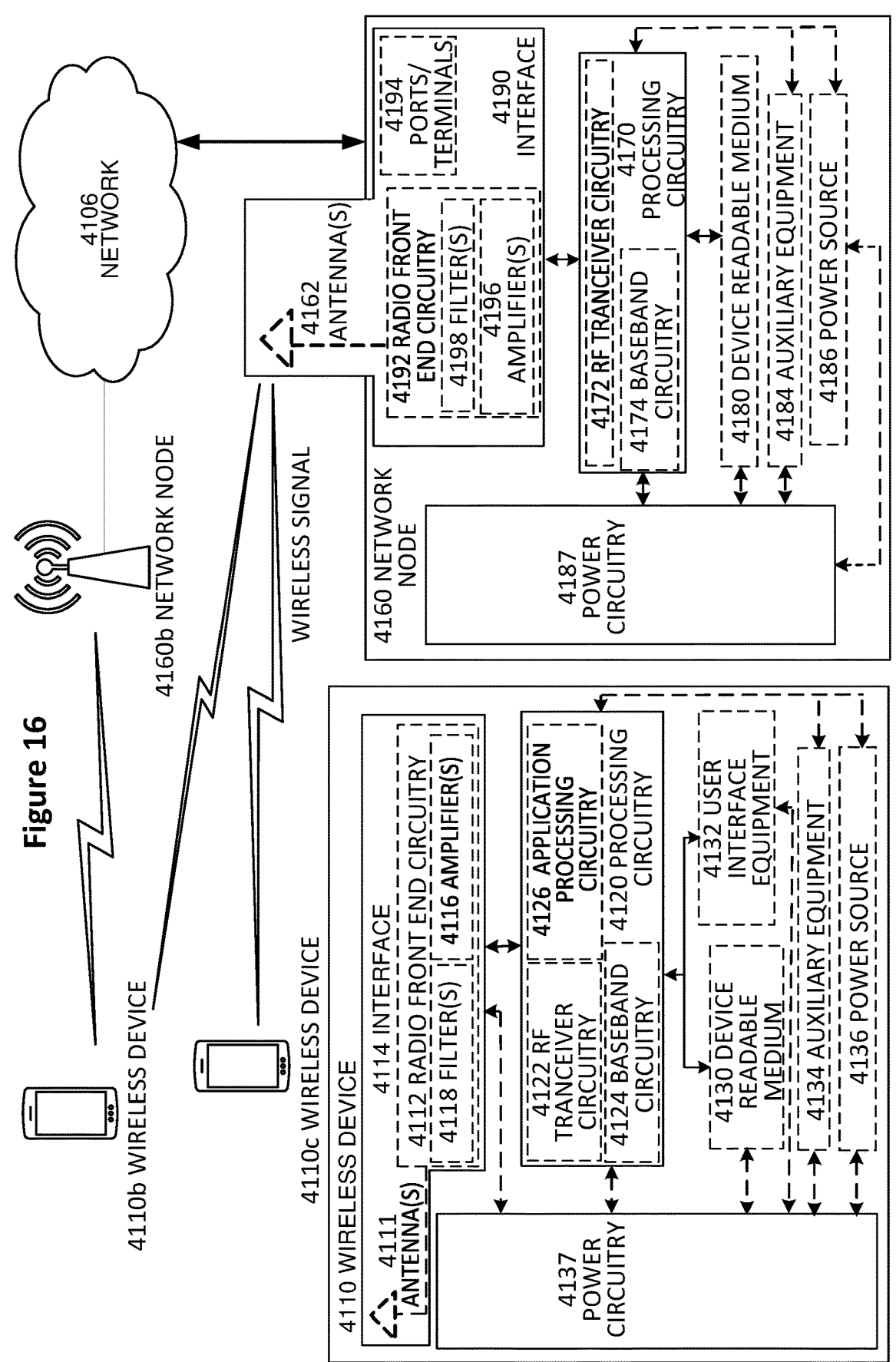
FIG. 16 is a block diagram of a radio network in accordance with some embodiments of the present disclosure.

FIG. 16 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, core nodes, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionalities may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, user equipment (UE) or communication service consumer (CSC) device refers to a device capable, configured, arranged and/or operable to communicate wirelessly with network nodes and/or other wireless devices. Unless otherwise noted, the term UE may be used interchangeably herein with user equipment, user device, communication device, wireless device (WD), and/or CSC device. Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by a computing device for a radio network for configuration of a network device on which network or data energy can be collected while preserving specified conditions in the radio network, the method comprising:

receiving inputs to a conditional generative model, the inputs comprising the specified conditions in the radio network comprising a value for a predicted key performance indicator, KPI, constraint parameter for a time period, a target value for a optimization parameter, and a latent variable; and outputting from the conditional generative model a configuration data for a future time period for the network node or the cell of the radio network, wherein the configuration data is bounded by the specified conditions comprising the predicted KPI constraint parameter, the target value for the optimization parameter, and the latent variable.

2. The method of claim 1, wherein the latent variable comprises an encoded representation of a value corresponding to the optimization parameter and a value corresponding to the predicted KPI constraint parameter.

3. The method of claim 1, wherein the target value for the optimization parameter has an adjustable value from a plurality of variable values, wherein each variable value in the plurality of variable values represents a combination of a value of a category of a KPI from a plurality of the predicted KPI constraint parameters and a value of a optimization parameter associated with the category of the KPI from the plurality of the predicted KPI constraint parameters.

4. The method of claim 1, wherein the configuration data comprises a plurality of settings for each of a plurality of configuration management attributes and hardware, respectively, for the network node or the cell.

5. The method of claim 1, wherein the value for the predicted KPI constraint parameter and the target value for the optimization parameter are each received from a prediction model and wherein the prediction model comprises a model trained with a performance management dataset.

6. The method of claim 5, wherein the performance management dataset comprises a multivariate timeseries form of periodic performance management counters in the radio network.

7. The method of claim 1, further comprising:

training a configuration management model, wherein the training comprises inputting a set of configuration management attributes to the configuration management model and outputting from the configuration management model a value for the predicted KPI constraint parameter and a value for the optimization parameter; and training a performance management model, wherein the training comprises inputting a set of performance management data to the performance management model and outputting from the performance management model a prediction for the predicted KPI constraint parameter for the time period and a prediction for the optimization parameter for the time period.

8. The method of claim 1, further comprising:

training the conditional generative model with a configuration management dataset comprising a plurality of configuration management attributes and a corresponding plurality of conditional variables, wherein each of the plurality of configuration management attributes is associated with a corresponding conditional variable comprising the configuration management attributes and a corresponding quantized form of each of the predicted KPI constraint parameter and the target value for the optimization parameter, and wherein the training the conditional generative model comprises receiving as an input to the conditional generative model all configuration management attributes associated with the corresponding plurality of conditional variables, and outputting a synthetic configuration file for the network node based on the input.

9. The method of claim 8, wherein the configuration management dataset comprises data for a first granularity and wherein the set of performance management data comprises data for a second granularity, and further comprising:

applying inverse transformation on the configuration management dataset to distribute the configuration management dataset on a greater granularity level compared to the first granularity prior to applying the inverse transformation.

10. The method of claim 1, further comprising:

automatically tuning the conditional generative model, wherein the automatically tuning comprises: predicting from a configuration management model the target value using an original configuration data, predicting from the conditional generative model the target value using a generated configuration data, wherein the generated configuration data corresponds to the an original state of the radio network via the predicted KPI constraint parameter and the optimization parameter, obtaining a distance between the original configuration data and the generated configuration data, and reducing the distance.

11. The method of claim 10, wherein the reducing the distance comprises at least one of:

retuning the configuration management model and the conditional generative model, respectively;

increasing a granularity of a discretization process for obtaining the quantized value of the predicted KPI constraint parameter and the quantized value for the optimization parameter;

adjusting a standard deviation in the conditional generative model; and using a distance evaluation metric, wherein the distance evaluation metric comprises at least one of a KL divergence, a Euclidean distance, a coefficient of determination, and a cosine similarity.

12. The method of claim 1, further comprising:

obtaining the target value for the optimization parameter based on perturbating on the optimization parameter while maintaining the value for at least one predicted KPI constraint parameter.

13. The method of claim 12, wherein the perturbating comprises perturbate on the optimization input to a decoder of the conditional generative model parameter while maintaining the value for the at least one predicted KPI constraint to obtain generated configuration management data and predictions of corresponding KPI and energy constraints.

14. The method of claim 1, further comprising:

quantifying a performance result for the configuration data, wherein the quantifying comprises inputting the configuration data to a configuration management model, outputting from the configuration management model a value for the predicted KPI constraint parameter and a value for the optimization parameter.

15. The method of claim 1, wherein the optimization parameter is an energy consumption of the network node or the cell, wherein the target value for the optimization parameter comprises a value for the energy consumption of the network node or the cell that is lower than a value for the energy consumption from an embedded representation of configuration data comprising different values of the predicted KPI constraint parameter and different values of the energy consumption, and wherein the predicted KPI constraint parameter comprises at least one or more of a radio resource control connection setup success rate, a call setup success ratio per data, a cell throughput in uplink and downlink, a cell utilization, a traffic data volume in uplink and downlink, an intra and/or inter frequency handover success rate.

16. The method of claim 1, wherein the network device comprises a base station or a device for a cell.

17. A computing device comprising a conditional generative model for configuration of a network node on which network or data energy can be collected while preserving specified conditions in a radio network, the computing device comprising:

at least one processor;

at least one memory connected to the at least one processor and storing program code that is executed by the at least one processor to perform operations comprising:

receive inputs to a conditional generative model, the inputs comprising the specified conditions in the radio network comprising a value for a predicted key performance indicator, KPI, constraint parameter for a time period, a target value for a optimization parameter, and a latent variable; and output from the conditional generative model a configuration data for a future time period for the network node or the cell of the radio network, wherein the configuration data is bounded by the specified conditions comprising the predicted KPI constraint parameter, the target value for the optimization parameter, and the latent variable.

18. A computing device comprising a conditional generative model for configuration of a network node on which network or data energy can be collected while preserving specified conditions in a radio network, the computing device adapted to perform operations comprising:

receiving inputs to a conditional generative model, the inputs comprising the specified conditions in the radio network comprising a value for a predicted key performance indicator, KPI, constraint parameter for a time period, a target value for a optimization parameter, and a latent variable; and outputting from the conditional generative model a configuration data for a future time period for the network node or the cell of the radio network, wherein the configuration data is bounded by the specified conditions comprising the predicted KPI constraint parameter, the target value for the optimization parameter, and the latent variable.

19. A computer program comprising program code to be executed by processing circuitry of a computing device comprising a conditional generative model for configuration of a network node on which network or data energy can be collected while preserving specified conditions in a radio network, whereby execution of the program code causes the computing device to perform operations comprising:

receive inputs to a conditional generative model, the inputs comprising the specified conditions in the radio network comprising a value for a predicted key performance indicator, KPI, constraint parameter for a time period, a target value for a optimization parameter, and a latent variable; and output from the conditional generative model a configuration data for a future time period for the network node or the cell of the radio network, wherein the configuration data is bounded by the specified conditions comprising the predicted KPI constraint parameter, the target value for the optimization parameter, and the latent variable.

20. The computer program of claim 19, wherein the latent variable comprises an encoded representation of a value corresponding to the optimization parameter and a value corresponding to the predicted KPI constraint parameter.

\* \* \* \* \*